United States Patent
Sullivan et al.

(10) Patent No.: US 9,996,322 B2
(45) Date of Patent: Jun. 12, 2018

(54) DYNAMICALLY GENERATED USER INTERFACE

(71) Applicant: Oracle International Corporation, Redwood Shores, CA (US)

(72) Inventors: Blake Sullivan, Redwood City, CA (US); Edward Farrell, Los Gatos, CA (US); Jing Wu, Foster City, CA (US); Venkata Guddanti, Centennial, CO (US); Min Lu, Fremont, CA (US); Hongbing Wang, Foster City, CA (US); Michael Elges, Littleton, CO (US); Michael William McGrath, San Ramon, CA (US); Gangadhar Konduri, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 1162 days.

(21) Appl. No.: 14/137,917

(22) Filed: Dec. 20, 2013

(65) Prior Publication Data
US 2014/0181703 A1    Jun. 26, 2014

Related U.S. Application Data

(60) Provisional application No. 61/745,585, filed on Dec. 22, 2012, provisional application No. 61/766,480, filed on Feb. 19, 2013, provisional application No. 61/832,149, filed on Jun. 7, 2013.

(51) Int. Cl.
*G06F 3/048* (2013.01)
*G06F 9/44* (2018.01)

(52) U.S. Cl.
CPC .............. *G06F 8/38* (2013.01); *G06F 9/4443* (2013.01)

(58) Field of Classification Search
CPC ............................ G06F 7/00; G06F 17/30398
See application file for complete search history.

(56) References Cited

U.S. PATENT DOCUMENTS

| | | | |
|---|---|---|---|
| 7,062,502 B1 * | 6/2006 | Kesler | G06F 17/3056 |
| 7,089,295 B2 | 8/2006 | Chrisifort et al. | |
| 2001/0012008 A1 * | 8/2001 | Hongawa | G06F 3/0481 |
| | | | 345/418 |
| 2006/0069694 A1 * | 3/2006 | Rossi | G06F 17/30398 |
| 2006/0190844 A1 * | 8/2006 | Binder | G06F 8/34 |
| | | | 715/853 |

(Continued)

*Primary Examiner* — William Bashore
*Assistant Examiner* — Rayeez Chowdhury
(74) *Attorney, Agent, or Firm* — Trellis IP Law Group, PC

(57) ABSTRACT

A system and method for facilitating automatically adjusting a user interface display screen or portion thereof. An example method includes determining context information associated with data, wherein the data is maintained in accordance with a data model; generating a signal when the context information changes; and employing the signal to automatically configure one or more characteristics of a user interface architecture, resulting in an adjusted user interface architecture. The context information may include information specifying one or more attributes relating to the data model. Generating may further include analyzing the one or more attributes to determine a modification to be made to the user interface architecture and then rendering a user interface display screen based on a modified user interface architecture.

19 Claims, 13 Drawing Sheets

(56) References Cited

U.S. PATENT DOCUMENTS

2008/0172603 A1 7/2008 Agarwal et al.
2012/0167016 A1* 6/2012 Rauh .................... G06F 9/4443
 715/854

* cited by examiner

| Manager | Hire Date | Employee Personal | | | Dept. Info. | |
|---|---|---|---|---|---|---|
| | | Emp. Number | Emp. Name | Emp. Salary | Dept. Number | Dept. Name |
| | Mon. Jul 12, '12 | 2345 | Smith | 150k | 10 | Research |
| 1234 | Tue. Apr. 25, '10 | 6789 | Scott | 120k | 10 | Research |
| | Tue. May 11, '10 | 3234 | Thomas | 90k | 20 | Sales |
| 5678 | Mon. Jul. 12, '10 | 4245 | Mike | 150k | 10 | Research |
| | Tue. Aug. 12, '21 | 5265 | Rick | 130k | 10 | Research |

FIG. 8

| Details | UI Hints | Entity Attribute | Dependencies | Custom Properties | List of Values |

Display: ●Display ○Hide
Label: Jing Test
Tooltip:
Format Type: <none>
*Format:*
*Time Zone:* <default>
Control Type: Default
Width: [ ] Characters
Height: [ ] Rows
Form Type: Detail
Category: Uncategorized
Auto Submit: False

FIG. 11

DYNAMICALLY GENERATED USER INTERFACE

CLAIM OF PRIORITY

This application claims priority from the following: U.S. Provisional Patent Application Ser. No. 61/745,585, entitled DYNAMICALLY GENERATED USER INTERFACE, filed on Dec. 22, 2012, and U.S. Provisional Patent Application Ser. No. 61/766,480, entitled DYNAMICALLY GENERATED USER INTERFACE INCLUDING NESTED AND/OR GROUPED ELEMENTS, filed on Feb. 19, 2013, and U.S. Provisional Patent Application Ser. No. 61/832,149, entitled DYNAMIC USER INTERFACE AUTHORING SYSTEM, filed on Jun. 7, 2013, which are hereby incorporated by reference as if set forth in full in this application for all purposes.

CROSS REFERENCES TO RELATED APPLICATIONS

This application is related to the following: U.S. Pat. No. 9,116,710 issued on Aug. 25, 2015, filed as application Ser. No. 14/137,924, entitled DYNAMIC USER INTERFACE AUTHORING, filed Dec. 20, 2013 and U.S. Pat. No. 9,891,897 issued on Feb. 13, 2018, filed as application Ser. No. 14/137,930, entitled DYNAMIC USER INTERFACE TAG FORMAT, filed Dec. 20, 2013, which are hereby incorporated by reference as if set forth in full in this application for all purposes.

BACKGROUND

The present application relates to software and more specifically to user interface designs, data models, and methods for displaying and interacting with data and/or concepts.

Software for facilitating presenting data and facilitating user interaction therewith are employed in various demanding applications, including enterprise resource planning, scientific research, digital libraries, data mining, financial data analysis, market studies, manufacturing production control, drug discovery, and so on. Such applications often demand versatile software that can efficiently display various types of data, which may be organized in various data structures or formats, i.e., data models.

Such versatile software can be particularly important in enterprise computing environments, where large, complex, and changing data sets and accompanying data models are common. In particular, long-running web applications commonly used in enterprise computing environments may be tasked with presenting data (e.g., via tables, forms, etc.), where ultimate characteristics (e.g., shape) of the associated data model (e.g., numbers of tables and rows, row widths, column heights, etc.) are unpredictable at design time.

However, conventionally, once a software application is developed and deployed, changes to underlying data models may necessitate reconfiguring and redeploying the software application to support the new data models. Reconfiguring and redeploying software applications can be time consuming and costly, especially in large enterprise environments.

SUMMARY

An example method facilitates dynamic configuration of a user interface display screen, including one or more components displayed therein. The example method includes determining context information associated with data, wherein the data is maintained in accordance with a data model; generating a signal when the context information changes; and employing the signal to automatically configure one or more characteristics of a user interface architecture, resulting in an adjusted user interface architecture.

In a more specific embodiment, the context information includes information specifying one or more attributes relating to the data model. The step of generating further includes analyzing the one or more attributes to determine a modification to be made to the user interface architecture. The signal includes a specification of the modification to be made to the user interface architecture.

Employing further includes generating information for rendering a user interface display screen in accordance with the adjusted user interface architecture. The generated information may include, for example, a width and/or height of a table based on a shape characteristic of the data model, as specified via the context information. One or more portions of the context information may be specified via user input.

The example method may further include employing the adjusted user interface architecture to render a user interface display screen. An example user interface display screen includes data and software functionality that has been automatically adjusted in accordance with one or more adjustments made to the user interface architecture in the step of employing.

Determining may further include deriving one or more portions of the context information from the user interface architecture. The one or more portions of the context information include a description of one or more user interface features or characteristics of the user interface display screen to be rendered. Such user interface features or characteristics may include, for example, one or more user interface validators.

The example method may further include employing the user interface architecture and user interface framework software encoding the user interface architecture to perform field-level stamping, whereby individual data attributes, e.g., corresponding data fields and/or user interface controls, are rendered via components of a user interface display screen.

The method may further include automatically determining one or more characteristics of a table to be displayed in a user interface display screen in accordance with the user interface architecture at runtime of a software application employing the method. The one or more characteristics may include table width or height. The context information may then be employed to automatically characterize and render one or more form fields in a user interface display screen.

The context information may further include information associated with a user, i.e., user data or user-related context information. The user-related context information may include information specifying one or more user privileges, such as enterprise software access permissions.

The step of employing may further include adjusting a binding between the data model and the user interface architecture based on the context information. The context information may further include information indicating a characteristic of a first a grouping of displayed data. The first grouping of displayed data may be displayed within a second grouping of displayed data. The context information may further include information indicating a characteristic of the second grouping of displayed data, thereby facilitating nested dynamic rendering of data and/or user interface controls or functionality in accordance with embodiments discussed herein.

Accordingly, certain embodiments discussed herein may obviate the need for conventional rigid data bindings defining interactions between a user interface architecture and accompanying data model, which typically necessitated reconfiguring and redeploying the software applications using the data model, in response to data model changes. Certain embodiments discussed herein overcome such shortcomings, in part, by employ data-model context information to facilitate dynamic runtime adjustment of user interface display screens and accompanying components in response to data model changes.

A further understanding of the nature and the advantages of particular embodiments disclosed herein may be realized by reference of the remaining portions of the specification and the attached drawings.

BRIEF DESCRIPTION OF THE DRAWINGS

FIG. 8 shows an example of a dynamic table exhibiting attribute grouping, which may be developed via the developer system of FIG. 5 and associated developer user interface display screen of FIG. 7, and which may be rendered as part of a webpage user interface display screen.

FIG. 11 shows an example developer user interface display screen for facilitating configuring user interface hints, i.e., contextual information, usable by webpage computer code to facilitate dynamic rendering of user interface components.

DETAILED DESCRIPTION OF EMBODIMENTS

Figure 1:
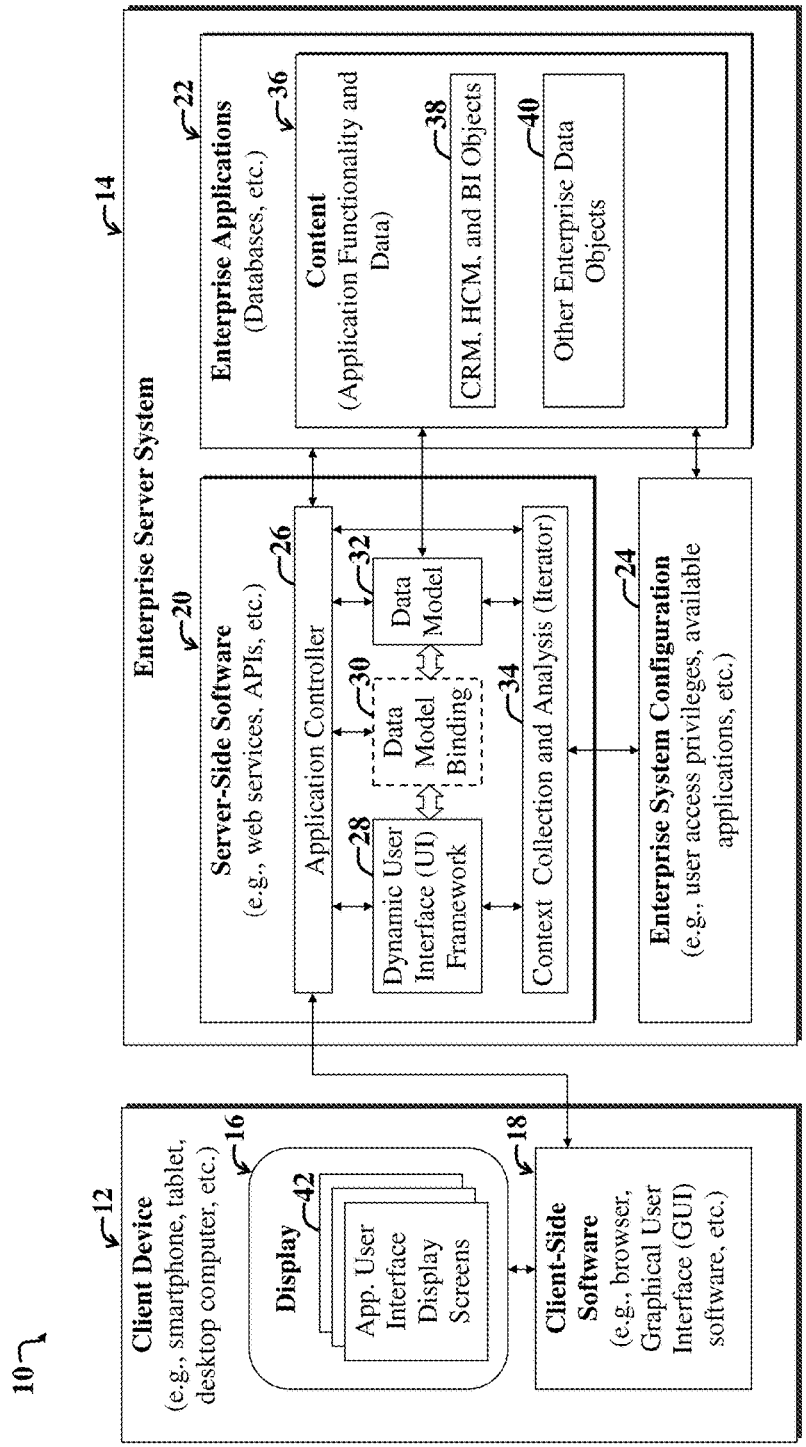
FIG. 1 is a diagram illustrating an example enterprise computing environment and accompanying system for facilitating dynamic rendering of user interface display screens and accompanying components based on context information, including context information pertaining to a data model to be used for rendering the user interface display screen.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for an enterprise. A computing environment may be may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include Financials, Assets, Procurement, Projects, Supply Chain, and so on. The terms "enterprise software," "enterprise software application," and "enterprise application" may be employed interchangeably herein.

Enterprise software applications, such as Customer Relationship Management (CRM), Business Intelligence (BI), Enterprise Resource Planning (ERP), and project management software, often include databases with various database objects, also called data objects or entities. For the purposes of the present discussion, a database object may be any computing object maintained by a database.

A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

Enterprise data may be any information pertaining to an organization or business, including information about customers, appointments, meetings, opportunities, customer interactions, projects, tasks, resources, orders, enterprise personnel and so on. Examples of enterprise data include work-related notes, appointment data, customer contact information, descriptions of work orders, asset descriptions, photographs, contact information, calendar information, enterprise hierarchy information (e.g., corporate organizational chart information), and so on. The terms "enterprise data" and "business data" are employed interchangeably herein.

For clarity, certain well-known components, such as hard drives, processors, operating systems, power supplies, routers, Internet Service Providers (ISPs), the Internet, and so on, have been omitted from the figures. However, those skilled in the art with access to the present teachings will know which components to implement and how to implement them to meet the needs of a given implementation.

FIG. 1 is a diagram illustrating an example enterprise computing environment and accompanying system 10 for facilitating dynamic rendering of user interface display screens 42 and accompanying components based on context information, including context information pertaining to a data model to be used for rendering the user interface display screen.

For the purposes of present discussion, context information may be any information that is auxiliary to source data used to render features of a user interface display screen, such as tables, visualizations, and so on. Source data may be any data used to build a structure of a user interface display screen or portion thereof. A structure of a user interface display screen may be characterized by a user interface architecture or framework, as discussed more fully below.

The example system 10 includes a client device 12 in communication with an enterprise server system 14 via a network, such as the Internet. The client device 12, which may represent a smartphone, tablet, desktop computer, and so on, includes client-side software 18 in communication with a display 16, which is adapted to display user interface display screens 42. The user interface display screens 42 are displayed in accordance with a dynamically updating user interface architecture, i.e., framework, as discussed more fully below.

For the purposes of the present discussion, a user interface display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

The client-side software 18 may include various software applications, such as a browser and accompanying Graphical User Interface (GUI) components, which are adapted to facilitate rendering the user interface display screens 42 based on rendering instructions. In the present example embodiment, rendering instructions are obtained by the client-side software 18 via server-side software 20 running on the enterprise server system 14.

Note however, that the positioning of various modules and functionality in the example system 10 is illustrative and may vary, without departing from the scope of the present teachings. Various modules of the system 10 may be omitted or combined with other modules or otherwise repositioned or distributed among computing resources of a network. For example, the server-side software 20 includes various modules 26-34, which may, in certain implementations, be implemented on the client device 12. Enterprise content 36 (or copies of portions thereof) used for rendering user interface display screens 42 may be maintained on the client-device 12.

The enterprise server system 14 further includes server-side software 20, which may be implemented via web services, Application Programming Interfaces (APIs), and so on, communicates with enterprise applications 22. The enterprise applications 22 may include various enterprise software applications, such as CRM, HCM, and BI applications and associated databases. The enterprise applications 22 maintain content 36, such as CRM, HCM, and BI computing objects 38 and other enterprise data objects 40. The database content 36 is accessible to the server-side software 20 and an enterprise system configuration module 24.

The server-side software 20 includes an application controller 26 in communication with a dynamic user interface framework module 28, a data model 32, data model bindings 30, and a context collection and analysis module 34, also called the iterator herein. The context collection and analysis module 34 further communicates with the dynamic user interface framework module 28 and the data model 32. The application controller 26 includes computer code for coordinating communications between various modules 28-34 of the server-side software 20, and between the client-side software 18 and enterprise applications 22.

For the purposes of the present discussion, a data model, such as the data model 32, may be structure or format characterizing an organization of data. The data may be organized in data objects, where certain relationships may occur between the data objects. These relationships may be considered part of the data model. A data model may further include a description of the objects, where the description specifies a collection of concepts and rules used in defining the structure of the data model. For example, a certain data model may employ relations and tuples between database records and fields. Depictions of data models are sometimes expressed graphically, e.g., via data modeling notation.

In operation, a user may employ the client device 12 to browse to a website employing the server-side software 20 to access (e.g., view and/or interact with) enterprise content 36 via user interface display screens 42 rendered in accordance with instructions obtained from the dynamic user interface framework module 28, also simply called the dynamic component 28.

The dynamic user interface framework module 28 includes computer code and information specifying a user interface architecture, i.e., framework for displaying components, including data and user interface controls, of a user interface display screen using data sourced from an underlying data model 32 and in accordance with one or more data model bindings 30. The dynamic user interface framework module 28 is adapted to facilitate dynamic user interface component rendering, which may be any automatic construction of a set of instructions and/or information used to display a user interface display screen.

For the purposes of the present discussion, a user interface architecture may be any framework or set of rules or guidelines employed to render a user interface display screen or portion thereof. A user interface architecture may, for example, specify a method and/or organization (e.g., organization of user interface controls and associated functionality) for enabling or facilitating user interaction with a software application.

The terms "user interface architecture" and "user interface framework" may be employed interchangeably herein. However, a user interface framework, as the term is used herein further includes any descriptions and accompanying computer code for rendering a user interface display screen in accordance with a set of criteria specifying how components of a user interface display screen are to be characterized, e.g., sized, positioned, shaped, validated, and so on.

For the purposes of the present discussion a binding may be a specification detailing how communication should be done between a first entity (e.g., a first software component, module, or application) and a second entity (e.g., a second software component, module, or application). Certain bindings may specify, for example, a particular protocol that can be used to communicate between entities. Note that an interface between entities may be characterized by multiple bindings.

A user interface display screen component (also simply called a UI component) is said to be bound to a data model if it is linked thereto, such that interaction with the user interface component will involve communication between the data model, e.g., data thereof, and the UI component.

The context collection and analysis module 34 is adapted to collect context information pertaining to or associated with the data model and/or a user and then determine any changes to make to the dynamic user interface architecture 28 and accompanying data model binding 30 to accommodate any changes to the data model or other context information.

Context information is said to be associated with a user if the context information is associated with a device or software accessible to the user. For example, user input provided via the client-side software 18 and display 16 specifying context information to be used by the dynamic user interface framework module 28 to adjust a user interface display screen may represent a type of user data.

For the purposes of the present discussion, user data may be any information characterizing or otherwise associated with a user of software and/or hardware. For example, user data may include user privileges information.

User privileges information may be any permissions or specification of permissions associated with a user, wherein the permissions specify whether or not and/or how a user may access or use data, software functionality, or other enterprise resources. Accordingly, user privileges information, also simply called user permissions or user privileges, may define what a user is permitted or not permitted to do in association with access or use of enterprise resources, such as computing resources.

Note that in certain embodiments discussed herein, user context information may be derived, in part, with reference to a permissions database that stores user enterprise access permissions, e.g., software and data access and use privileges. Such permissions database may be accessible to and/or maintained via the enterprise system configuration module 24.

Note that the context information may collect context information from various sources and via various mechanisms, including via analysis and monitoring of the data model, user data accessible via the enterprise system configuration module 24, and user input provided via the client device and accompanying rendered user interface display screens 42. Accordingly, the user interface display screens 42 associated with the server-side software may include one or more user options, e.g., user interface controls for enabling a user to specify one or more portions of the context information.

Context information collected via the context collection and analysis module 34 from the data model 32 may include various data attributes, including data model shape characteristics. A data attribute referring to a data model may be any characteristic of the data model or accompanying data used to generate a user interface display screen or component thereof. Examples of attributes include data dimensions or layers, such as specified by table headers of tables used to store the data used for generating a user interface display screen or components thereof. A shape characteristic of a data model may refer to, for example, a number of columns and/or rows in a database table or grid; maximum lengths of data strings in each grid field; orientations of data strings, and so on.

If a data attribute of the data model 32 changes sufficiently to warrant a change in the dynamic user interface framework 28 (i.e., dynamic component 28) and/or data model binding, as determined by computer code running on the context collection and analysis module 34, then the module 34 issues a signal to the dynamic user interface framework module and/or controller 26 to affect corresponding changes to the dynamic user interface architecture maintained by the dynamic component 28 and/or to the data model bindings 30. The signal includes one or more specifications of any modifications to be made to the user interface architecture maintained via the dynamic component 28.

Accordingly, the server-side software 20 may be adapted to adjust data model bindings 30 and/or user interface architecture based on context information and analysis rules maintained via the context collection and analysis module 34. This results in an updated user interface architecture, which is then employed by the dynamic component 28 to issue adjusted rendering instructions to the client-side software 18. The client-side software 18 then employs the rendering instructions to adjust the user interface display screens 42 accordingly.

Exact details of various system modules, such as the context collection and analysis module 34 are implementation specific and may vary. Those skilled in the art with access to the present teachings may readily determine and implement software and associated instruction sets and methods discussed herein to meet the needs of a given implementation, without departing from the scope of the present teachings.

Hence, the system 10 is adapted to facilitate declarative configuration of a web application 20, thereby avoiding application reconfiguring and deployment. The context collection and analysis module 34 (also simply called the analysis module 34) may act as a module for analyzing the data model 32 to determine characteristics thereof, i.e., context information, which may include information (e.g., "hints") characterizing user interface features, such as the width of a user interface control, label formatting, control type, and so on.

The dynamic component 28 may act as a GUI module for generating user instructions for rendering the user interface display screens 42 with reference to the accompanying user interface architecture (i.e., framework), and context collection and analysis module 34, and hence, the data model 32.

The dynamic component 28 and accompanying user interface architecture framework may communicate user interface specific features to the analysis module 34, such as user interface validators. For the purposes of the present discussion, a user interface validator may be any mechanism, e.g., software or message, adapted to verify a validity or correctness of a user interface display screen or component thereof to be rendered or already rendered.

Note that a user interface validator may refer to a software module, component, or program, but may also refer to a message sent from user interface validator software, where the message characterizes whether a given user interface display screen conforms to a given set of criteria. For example, if an example user interface validator may prevent a user from typing a name into a date field of a form. Other validators may provide, for example, field autocompletion functionality.

In the present example embodiment, the dynamic component 28, i.e., dynamic user interface framework 28 includes computer code for supporting stamping at the field level, i.e., field-level stamping. Accordingly, the user interface architecture and accompanying framework software 28 is adapted to encode the user interface architecture to enable field-level stamping.

For the purposes of the present discussion, field-level stamping may be any dynamic rendering of a component or attribute (e.g., a field of a table) of a user interface display screen, resulting in display of the component. The component is said to be stamped in the user interface display screen when the user interface display screen and accompanying component is displayed. Note that individual data fields or user interface controls may represent examples of components of a user interface display screen.

A user interface form field may be any region adapted to accept user input in a form presented via a user interface display screen. A form field (or other user interface display screen component) is said to be automatically or dynamically characterized at runtime if one or more characteristics of the form field are determined by software during execution of a software application employed to facilitate displaying the form field. The one or more automatically characterized form fields are then rendered, e.g., displayed in the user interface display screen in accordance with the characterization, i.e., description used to render the one or more form fields.

Accordingly, note that, the server-side software 20 may enable, for example, dynamic, i.e., automatic runtime determination of user interface table width based on a shape of a data model (e.g., as described via context information), such as that data model 32. This obviates the need to preconfigure table column sets and bindings to the data model at design time.

Accordingly, user interface form fields may be dynamically determined at runtime based on data context. For example, a user interface form based on a "person" data object might display three fields for an employee record, but five fields for a manager record.

Hence, the present example embodiment 10 is adapted to enable dynamic changes to how data is displayed based on information (i.e., hints) characterizing the associated data model and/or other context information, thereby obviating the need to reconfigure and redeploy applications to accommodate changing data models and/or other context. Such capabilities may be particularly important for web applications that must render data maintained via a data model characterized by a displayable shape that is unpredictable at design time.

For example, in certain web applications, the display of a table of data may change at runtime based on the user or account that is executing the web application. In such an example, more, less or different types of data may be available to a particular user. In another example, the physical properties (e.g., display size, input controls, etc.) of a device may constrain the display of data. For example, the size of a display, whether input is being provided by mouse, keyboard, touch screen, etc., may each be a factor in the way the data is displayed or in which input is accepted, or may implicate other aspects of a user interface (UI).

Such a user interface may not be susceptible to configuration at design time with fixed user interface controls and data binding between a model and the user interface architecture. In such cases, it may be particularly desirable to employ embodiments discussed herein to allow applications to change how data displays. This may be done, in part by obtaining context information, e.g., "hints" based on attributes of the data to be displayed. These hints may be obtained from the data model at runtime without reconfiguring and redeploying an application.

Figure 2:
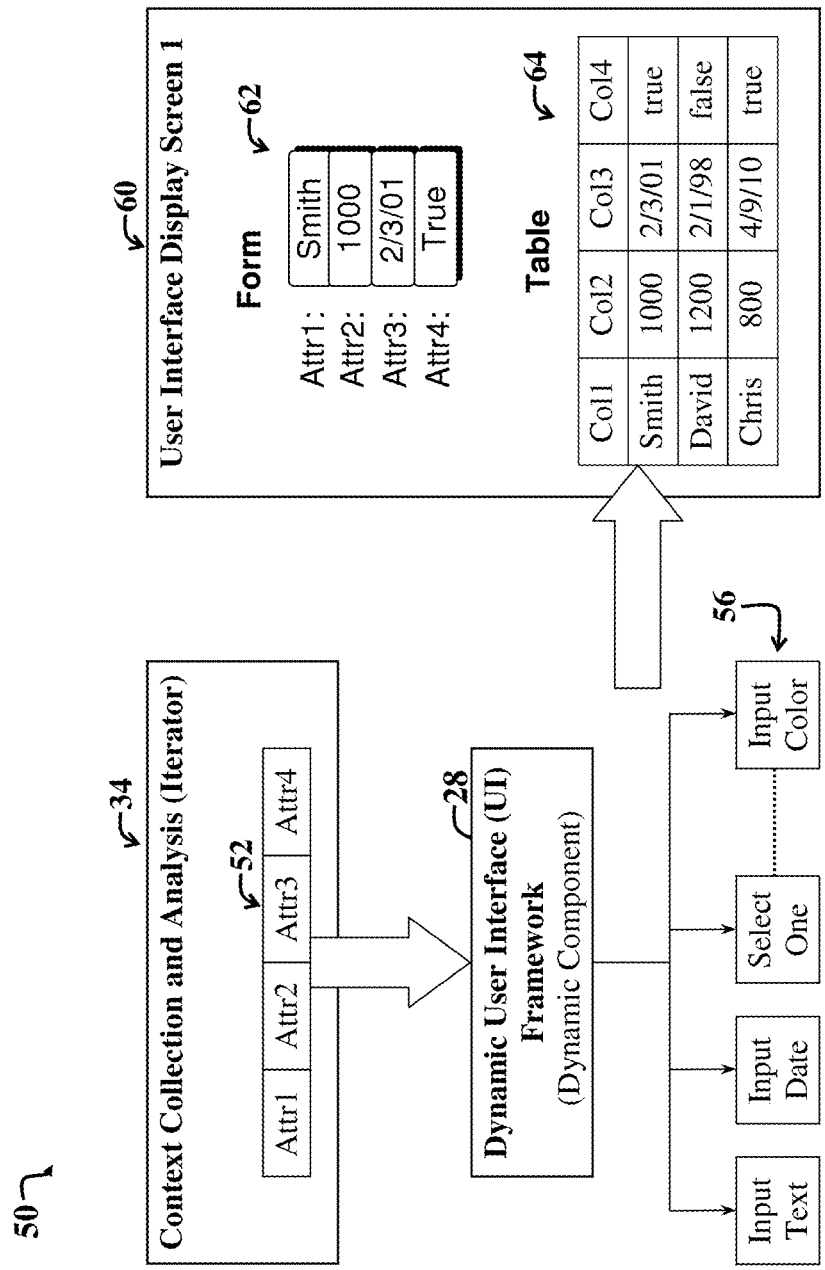
FIG. 2 shows a first example illustrative implementation of an embodiment constructed in accordance with the system of FIG. 1 and used to render a table based on a form.

FIG. 2 shows a first example illustrative implementation of an embodiment 50 constructed in accordance with the system 10 of FIG. 1 and used to render a table 64 based on a form 62, as shown in a first example user interface display screen 90. The first example user interface display screen may correspond to one of the user interface display screens 42 of FIG. 1. In FIG. 2, the iterator 34, also called the context collection and analysis module (as shown in FIG. 1), analyzes attributes 52, of a data model or data shape to be displayed. In this example, the data shape manifests as a table 64 having a given number of rows and columns. The attributes 52 labeled Attr1-4 can include any type of information about the table, its components, or other aspects of displaying, manipulating or handling the data model in a computing system.

For example, each attribute 52 may include information about a column of the table 64. Each attribute 52 can be a data item, element, structure or other object. Attr1 in attributes 52 corresponds to Col1 in the user interface display screen 60; Attr2 corresponds to Col2; Attr3 corresponds to Col3; and Attr4 corresponds to Col4. In this example, each attribute 52 can be a data structure that includes information about the column and its associated data such as column width, color, type of variable or value (e.g., text, numeric, Boolean, etc.) character font and size, etc.

The dynamic component 28, also called the dynamic user interface framework module with reference to FIG. 1, uses the attributes 52 to obtain hints, i.e., context information, about how to display the data shape according to predetermined rules. For example, if an attribute specifies a column with an input text component, then the predetermined rule to handle input text for that user or device (or other variant) is invoked. For example, a dynamic form, such as input area 62, is generated by underlying software at runtime to allow input of text for the column data corresponding to Attr1.

In a particular embodiment, each attribute 52 can be used to generate an individual user interface control in a form, such as the form 62. While in a dynamic table, each attribute 52 may be used to generate a user interface for a column or other element of a table or other data shape.

Figure 3:
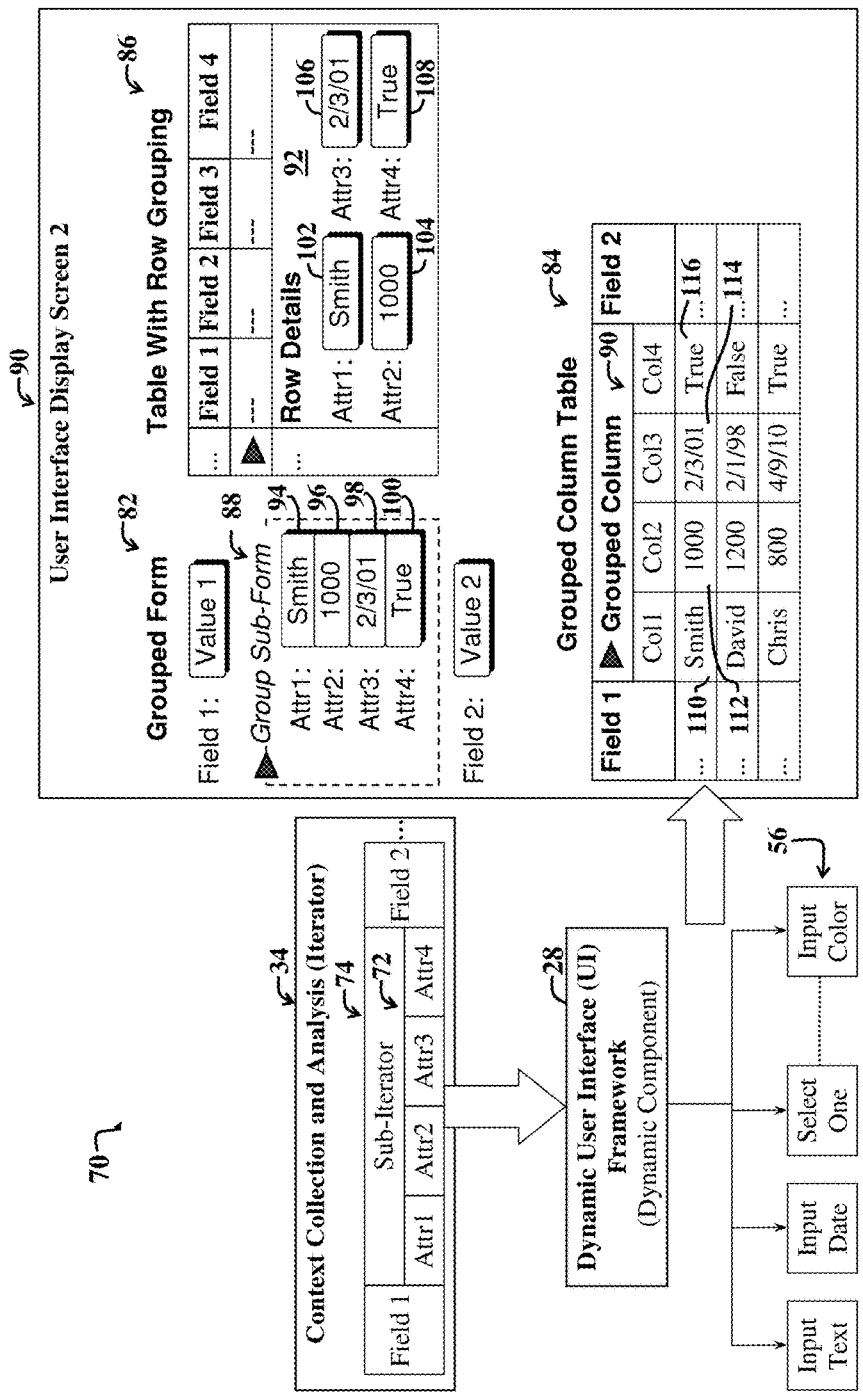
FIG. 3 shows a second example illustrative implementation, representing the implementation of FIG. 2 adapted to support nested and/or grouped data representations.

FIG. 3 shows a second example illustrative implementation, representing the implementation 50 of FIG. 2 after adaptation to support nested and/or grouped data representations. In particular, FIG. 3 illustrates a data model that can be used to render data with row or column grouping, as shown in a second example user interface display screen 90.

The choice of how data is displayed when there is more than one possibility can be by a control operated by a user, automated, provided by a default setting, or by any other acceptable means. This can allow the choice to show all the data in a column or row based format. The content can be maintained locally even for content that is not currently displayed so that a fetch, call or access of another database, data site or server may not be necessary.

Attributes 72 (e.g., as further identified by labels Attr1, Attr2, Attr3, Attr4) from a nested iterator 74, which represents a sub-iterator, i.e., an iterator that nested within another iterator (e.g., iterator 34), can be used to display a group of attributes inside a form 82 or a group of columns inside a table column, e.g., as shown in a column-grouped table 84. The attributes 72 can also display a group of form fields for a row, e.g., as shown in a row-grouped table 86.

The group can be a disclosure region as well (form, columnar or row disclosure). The nested iterator 74 can also implement nesting for grouping purposes. In this case, the entire form 82 with grouping, table with column grouping 84 or table with row disclosure grouping 86 can be built dynamically via use of the nested iterator 74.

Each of the various sections 82-86 include example sub-sections 88-92 implemented via dynamic components that make use of a nested iterator, such as the sub-iterator 74, to retrieve attribute data, e.g., from the database(s) 22 of FIG. 1. The grouped form 82 includes a group sub-form section 88 with attribute fields 94-100 that display data corresponding to attributes labeled Attr1, Attr2, Attr3, and Attr4, respectively. Similarly, the grouped column table 84 includes a grouped column section 90 with table attribute fields 110-116 that display data corresponding to the same attributes as those corresponding to the form fields 94-100 i.e., attributes labeled Attr1, Attr2, Attr3, and Attr4, which correspond to attributes labeled Col1, Col2, Col3, Col4, respectively in the grouped column section 90. Similarly, table with row grouping 86 includes a nested row details section 92 with row details fields 102-108 that display data corresponding to the same attributes as those corresponding to fields 94-100 and 110-116 of the sub-form section 88 and grouped column section 90, respectively, i.e., attributes labeled Attr1, Attr2, Attr3, and Attr4.

Note that the various sections 82-86 of the second example user interface display screen 90 represent examples of user interface sections (i.e., example form 82 and tables 84, 86) that may be rendered via one or more dynamic components that access one or more attributes (e.g., attributes 72) collected from a database via use of one or more sub-iterators (e.g., sub-iterator 74). In other words, the different user interface sections 82-86 and their respective dynamic nested portions 88-92, represent different examples of attribute nesting/grouping (i.e., in tables and a form) that may be implemented via use a sub-iterator. Note that, in practice, each of the different sections 82-86 and accompanying respective sub-sections 88-92 may be implemented via different sub-iterators and associated dynamic components that are positioned within different main iterators.

Accordingly the various attributes (Attr1, Attr2, Attr3, Attr4) in the different sections 82-86 represent the same underlying attributes, just rendered in different example user interface sections 82-86. For example, with reference to the group sub-form section 88 of the grouped form 82, the first attribute labeled Attr1 is characterized by the name "Smith" as indicated in the associated first form field 94. Similarly, the second attribute labeled Attr2 is characterized by a value of 1000 as indicated in the second form field 96. The third attribute labeled Attr3 is characterized by a date "2/3/01" as indicated in the third form field 98; the fourth attribute labeled Attr4 is characterized by the Boolean value "True" as indicated in the fourth form field 100. Note that values for the various attributes (Attr1, Attr2, Attr3, Attr4) indicated in the fields 94-116 of the different user interface sections 82-86 may be retrieved from one or more database records via one or more sub-iterators and one or more main iterators encompassing the one or more sub-iterators.

Note that in the present example embodiment, the context information, e.g., as collected via the context collection and analysis module 34, includes information indicating a characteristic of a first a grouping of displayed data, wherein the first grouping of displayed data (e.g., group sub-form 88, grouped column section 90, and row details section 92) is within a second grouping of displayed data (e.g., grouped form 82, grouped column table 84, and table with row grouping 86, respectively), and wherein context information further includes information indicating a characteristic of the second grouping of displayed data (e.g., indicating whether it is a form, table with row grouping, or grouped column table).

Figure 4:
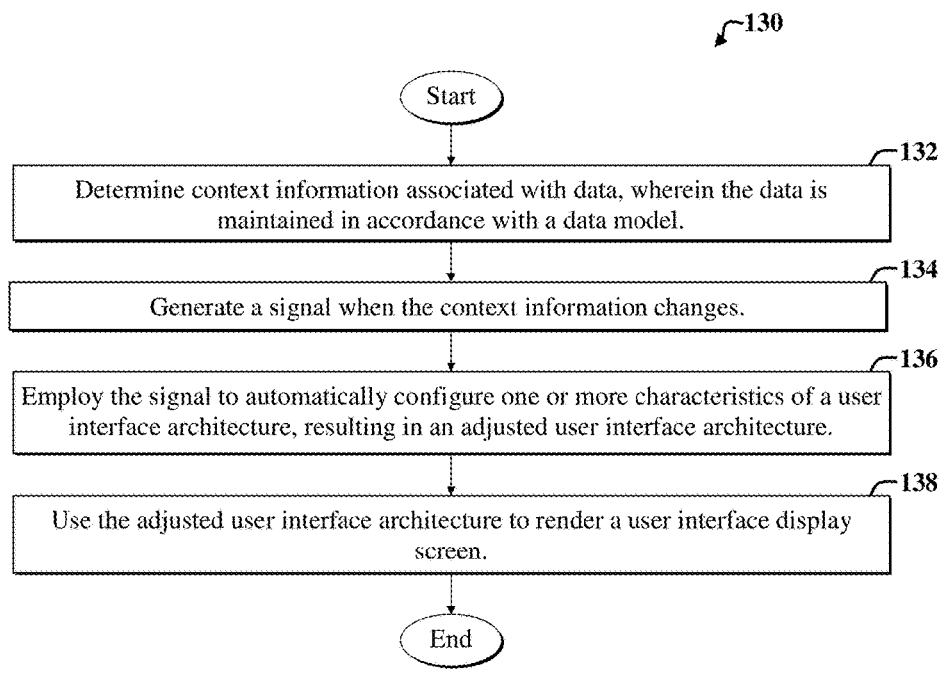
FIG. 4 is a flow diagram of an example method adapted for use with the embodiments of FIGS. 1-3.

FIG. 4 is a flow diagram of an example method 130 adapted for use with the embodiments of FIGS. 1-3. The method 130 is adapted to facilitate configuration of a user interface display screen, and includes a first step 132, which includes determining context information associated with data, wherein the data is maintained in accordance with a data model.

A second step 134 includes generating a signal when the context information changes.

A third step 136 includes employing the signal to automatically configure one or more characteristics of a user interface architecture, resulting in an adjusted user interface architecture.

A fourth step 138 includes employing the adjusted user interface architecture to render a user interface display screen.

Note that the method 130 is merely illustrative and may vary, without departing from the scope of the present teachings. For example, certain steps may be omitted or combined with other steps, and additional steps and/or details may be added. The steps illustrated in method 130 may be otherwise changed or modified.

For example, the context information may include information specifying one or more attributes relating to the data model. The second step 134 may further include analyzing the one or more attributes to determine a modification to be made to the user interface architecture. The third step 136 may occur at runtime of software used to construct a user interface display screen based on the adjusted user interface architecture. The third step 136 may further include generating information for rendering a user interface display screen in accordance with the adjusted user interface architecture.

The generated information includes table width or height based on a shape characteristic of the data model, and the shape characteristic is included among the context information. The method 130 may further include providing a user option to specify one or more portions of the context information.

The user interface display screen rendered in the fourth step 138 may include data and software functionality that has been automatically adjusted in accordance with one or more adjustments made to the user interface architecture in the third step 136.

The first step 132 may further include deriving one or more portions of the context information from the user interface architecture. The one or more portions of the context information may include a description of one or more user interface features or characteristics of the user interface display screen to be rendered. The one or more user interface features or characteristics include one or more user interface validators.

The method 130 may further include employing the user interface architecture and user interface framework software that encodes the user interface architecture to perform field-level stamping.

The first step 132 may further include automatically determining one or more characteristics of a table to be displayed in a user interface display screen in accordance with the user interface architecture at runtime of a software application employing the method, wherein one or more characteristics include table width or height.

The third step 136 may further include employing the context information to automatically characterize and render one or more form fields in a user interface display screen.

Figure 5:
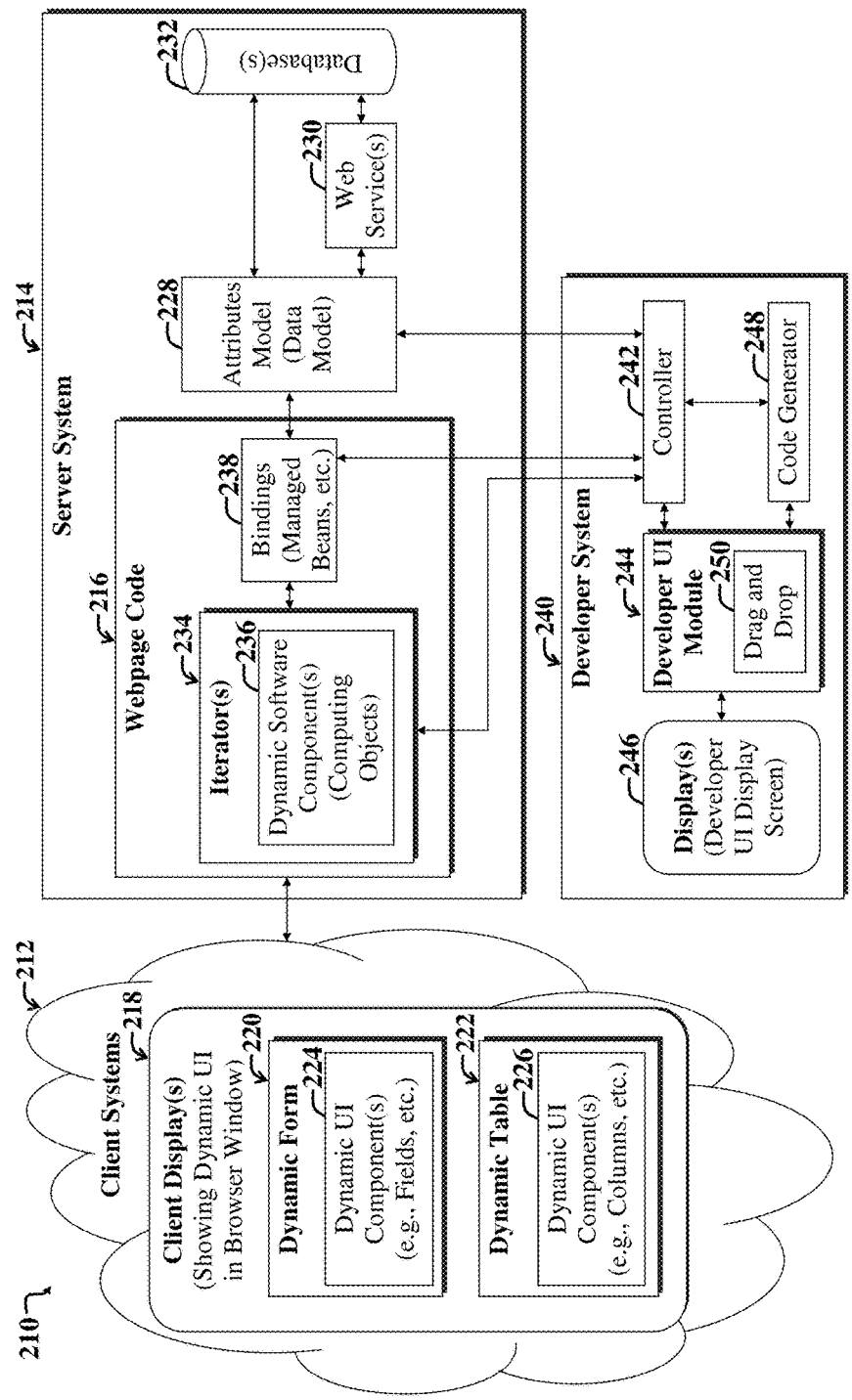
FIG. 5 is a diagram illustrating a second example enterprise computing environment and accompanying system adapted to facilitate authoring and implementing dynamic user interface display screen components.

FIG. 5 is a diagram illustrating a second example enterprise computing environment and accompanying system 210 adapted to facilitate authoring and implementing dynamic user interface display screen components 224, 226, such as table columns, form elements, and user interface controls rendered for a webpage via a client display 218.

The system 210 includes client systems 212, such as desktop computers, mobile devices, and so on, in communication with a server system 214 via a network, such as the Internet. The server system 214 includes webpage computer code, also simply called webpage code, used to render user interface components 220, 222 of a webpage via client device displays 218.

For the purposes of the present discussion, webpage computer code may be any computer code, such as programming language statements, webpage markup (e.g., HTML, XML, or other markup) that defines or otherwise specifies instructions for rendering features of a user interface display screen in a browser used to view the webpage. A rendering of a webpage may be any display of a user interface display screen associated with or defined by a webpage. A webpage may be any document or content viewable via a network from a client device.

A User Interface (UI) component may be any collection of one or more UI features or elements, such as one or more table columns, form fields, buttons, and other UI controls. The term "UI component" differs from the term "software component," as used herein. While a software component may be used to generate a UI component and may be associated therewith, a software component may be any computing object, also simply called object herein, which is part of a software application or module, as discussed more fully below.

For the purposes of the present discussion, an object may be any grouping of or encapsulation of data and/or functionality. Examples of objects include classes or structures implemented via object-oriented programming languages; tables, rows, or records of a database; and so on. Generally, a data object refers to an object that includes primarily data or definitions. A computing object typically includes functionality, e.g., corresponding to methods (e.g., getter methods) or functions and may also include data.

A business object may be any object used to organize information for business purposes. An example business object may be formed by creating a name for the business object, such as "CRM Opportunity 1" or "Goal 1" and then associating information with the name. For example, "CRM Opportunity 1" object may be associated with a conversation, one or more enterprise personnel, one or more kudos assigned to a team that is associated with the object, and so on. Data that is associated with a business object may be contained within a data structure or database associated with the object, or the information may be distributed among different applications, computers, and so on, without departing from the scope of the present teachings.

A representation of an object, i.e., a displayed object, may be displayed via a graphical depiction, such as a column of a table, a field in a form, a node of a tree diagram, a menu item, a dialog box, a personnel icon, an entire UI display screen, and so on. The graphical depiction of an object may also be called an object, a displayed object, or a node.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

The webpage code 216 communicates with an attributes model 228 (e.g., via bindings 238), which is a type of data model maintained via the server system 214. The server system 214 also includes databases 232 that store data, which may be used to populate structures or objects of the attributes model 228 (e.g., via getter methods invoked via the data model 228). Note that in certain implementations, web services 230 are employed to facilitate retrieving data from the databases 232 for use by other software applications and/or modules.

For the purposes of the present discussion, a web service, also simply called a service herein, may be any computer code and associated functionality that is adapted to be shared or reused by different applications, processes, or other web services (that may be distributed across a network), which access the functionality, e.g., via a Web Services Description Language (WSDL) interface consistent with a description of the web service. A web services model may represent a loosely coupled integration model for allowing flexible integration of various network-distributed applications or processes.

Software functionality may be any function, capability, or feature, e.g., stored or arranged data, that is provided via computer code, i.e., software. Generally, software functionality may be accessible via use of a UI and accompanying UI controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

In general, the server system 214 may be implemented as a Server Oriented Architecture (SOA) server system. For the purposes of the present discussion, an SOA server system may be any collection of one or more SOA servers, where an SOA server may be any server that is adapted to facilitate providing services or subprocesses accessible to one or more client computers coupled to a network. A server may be any computing resource, such as a computer and/or software that is adapted to provide content, e.g., data and/or functionality, to another computing resource or entity that requests it, i.e., the client. A client may be any computer or system that is adapted to receive content from another computer or system, called a server.

The example webpage code 216 further includes one or more iterators 234 in communication with the attributes model 228 via an interface, such as one or more bindings 238, which may be implemented via one or more managed Beans (also called MBeans) or other software functionality. The MBean(s) 238 may contain getters and setters for attributes and operations for facilitating interfacing webpage computer code 216 with the attributes model 228. Accordingly, the MBean 238 may include computer code for facilitating implementing computer logic used for webpage functionality and computer code for retrieving data from a database characterized by the data model for use by and/or display via the webpage.

The iterator 234 is adapted to selectively collect data from the attributes model 228 and provide the collected data to one or more dynamic software components 236 included within the iterator 234. For the purposes of the present discussion, an iterator, also called an iterator component, may be any collection of one or more programing language structures (objects, classes, etc.) or other mechanisms for collecting data and selectively providing (or otherwise making accessible) the data to sub-components, such as one or more dynamic components.

For the purposes of the present discussion, a dynamic component may be any specification of a UI feature, such as a date field, text input field, and so on, wherein the specification includes or is otherwise associated with information (called attributes) characterizing data to be associated with or included in the feature, and/or any functionality (associated with a UI component to be generated based on the dynamic component) to be associated with or accessible via the feature. The specification may include computer code that is adapted to generate (e.g., at runtime) a UI component based on the specification of the UI feature.

For example, a dynamic component for a date field may include a data attribute indicating that the data included in the field will be of type "Date," and the associated functionality may be "Input Date" functionality, which may include computer code for facilitating receiving date information input via a user, calendar application, database, and so on. Such a dynamic component may be called an Input-Date dynamic component, which during runtime, will be replaced in the UI display screen with the corresponding date UI component (e.g., UI feature) specified by the Input-Date dynamic component.

Note that the meaning of the term "component" herein, taken in context, may refer to a software component, such as a computing object (e.g., an object oriented programming language class), or a UI component (e.g., a UI feature or UI element). Generally, a dynamic component refers to a software component used to generate a corresponding UI component at runtime of webpage computer code 216.

A given UI component may be considered to include both illustrated data and functionality provided by the UI element. For example, a UI component that represents a drop-down menu may include both data listed in the drop-down menu, and functionality associated with drop-down UI control of the UI component. Accordingly, the term 'UI component' (as opposed to simply "component") may be any UI feature (e.g., UI field and associated UI control) and may refer to both data attributes and any functionality associated with the UI feature.

Furthermore, a dynamic component characterizes the UI component and facilitates dynamic construction of the UI component at runtime based on attributes and functionality specified via the dynamic component. For example, a certain dynamic component may specify creation of a text field (attribute=string, component=inputText).

For the purposes of the present discussion, the term "indicator for dynamic rendering" may be any dynamic component and/or other software mechanism(s) that is adapted to dynamically or automatically facilitate constructing computer code for rendering a UI display feature based on a data model and/or data accompanying the data model. Dynamic construction of a UI feature or element, i.e., UI component, may be any automatic generating of rendering instructions used to display the UI component in a UI display screen.

An iterator may be any computer code and/or computing object that includes instructions or a specification of instructions adapted to facilitate processing one or more dynamic components to generate corresponding UI display screen features (e.g., UI components to replace dynamic component objects included in computer code of a webpage). Accordingly, an iterator may include functionality for collecting attributes (e.g., from an attributes model computing object 228) for each dynamic component 236 included in the iterator 234. An iterator may define a collection of attributes, where for each attribute, for example, a table column and associated UI component may be built by a dynamic component.

When the iterator 234 collects attributes, such as for columns of a table, and provides each attribute to a dynamic component 236 for construction of a corresponding UI component 224, 226, the iterator 234 is said to stamp the columns. Note that, despite being called "an iterator," the iterator 234 need not perform any type of mathematical iteration or recursion, but instead may perform linear processing (and reprocessing) of and/or acquisition of data in a data model, such as the attributes model 228.

The meaning of term "attribute," as employed herein, may vary depending upon the context in which it is used. For example, in one context, an attribute may specify information or characteristics of a computing object that contains metadata associated with an attribute name. In another context, the attribute may refer to any information characterizing a UI component to be generated by a dynamic component.

For example, when referring to forms, an attribute may correspond to an employee name or other field name. A property of the attribute may refer to the definition (e.g., metadata property), e.g., the actual name of the employee. Similarly, when referring to tables, for example, an attribute may correspond to a column, where the header or name of the column corresponds to the named attribute, and where each field of the column corresponds to a UI element generated by a dynamic component used to construct the column based on data retrieved from a parent iterator object, i.e., software component. Accordingly, individual fields of the column may correspond to different attribute properties to be manifested as UI components or elements during rendering of an associated UI display screen, e.g., via a browser that accepts rendering instructions from the webpage code 216.

When referring to computing objects, such as an application view object representing a "Person" object, attributes of the object may correspond, for example, to "First Name", "Middle Name", "Last Name", "Street Address", "City" and "State." Note that in grouping or nesting implementations (e.g., where a given column has sub-columns, or where a form is separated into sections or groups), different attributes may be assigned to different categories. For example, "First Name", "Middle Name", "Last Name" may be assigned to a Name category, while "Street Address", "City" and "State" may be assigned to an Address category. In such grouping implementations, the iterators 234 may include one or more switchers, facets, sub-iterators, and associated dynamic components, as discussed more fully below.

The overall system 210 further includes a developer system 240, such as a separate computer system in communication with the server system 214. Alternatively, functionality and associated modules 240 implementing the developer system 240 may be implemented as part of the server system 214.

The example developer system 240 includes a controller 242 in communication with a code generator 248 and a UI developer module 244. The UI developer module 244 may include computer code for providing various functionality, including drag-and-drop features 250 for enabling a developer to drag and drop icons representing computing objects into a portion of a developer UI display screen 246 to facilitate automatic generation of computer code via the code generator 248. Changes made to software via the developer system 240 may be propagated to the webpage code 216, e.g., the iterators 234 and accompanying dynamic software components 236, the bindings 238, and the attributes model 228.

In the present specific embodiment, the system 210 is said to be data-model driven, such that changes made to the attributes model 228, e.g., via the developer system 240, are automatically propagated to the client displays 218 and accompanying UI display screen features 220-226, since the dynamic software components 236 are adapted to generate UI components based on the accompanying attributes model 228, i.e., data model.

Accordingly, in operation, after a developer has authored the attributes model 228, and the webpage code 216 is authored to enable dynamic adaptation thereof to the attributes model 228, then certain changes made to the attributes model (e.g., data model shape changes) may not require redevelopment of the associated webpage code 216.

Note that the system 210 is illustrative and may vary in accordance with the needs of a given implementation. For example, various modules of the system 210 may be combined with other modules; may be connected differently than shown; and may be distributed across a network in a different manner than shown, without departing from the scope of the present teachings. For example, the webpage code 216 may include various additional modules, such as switcher components, facets, sub-iterators, and so on, as discussed more fully below. Furthermore, the server system 214 may include several servers and/or data centers, without departing from the scope of the present teachings.

Those skilled in the art will appreciate that implementation of the system 210 may further involve use of additional well known components, such as view objects, form or table layout objects, and other webpage markup in the webpage code 216. Those skilled in the art with access to the present teachings may readily determine and implement appropriate software components and associated computer code to meet the needs of a given implementation, without undue experimentation.

Figure 6:
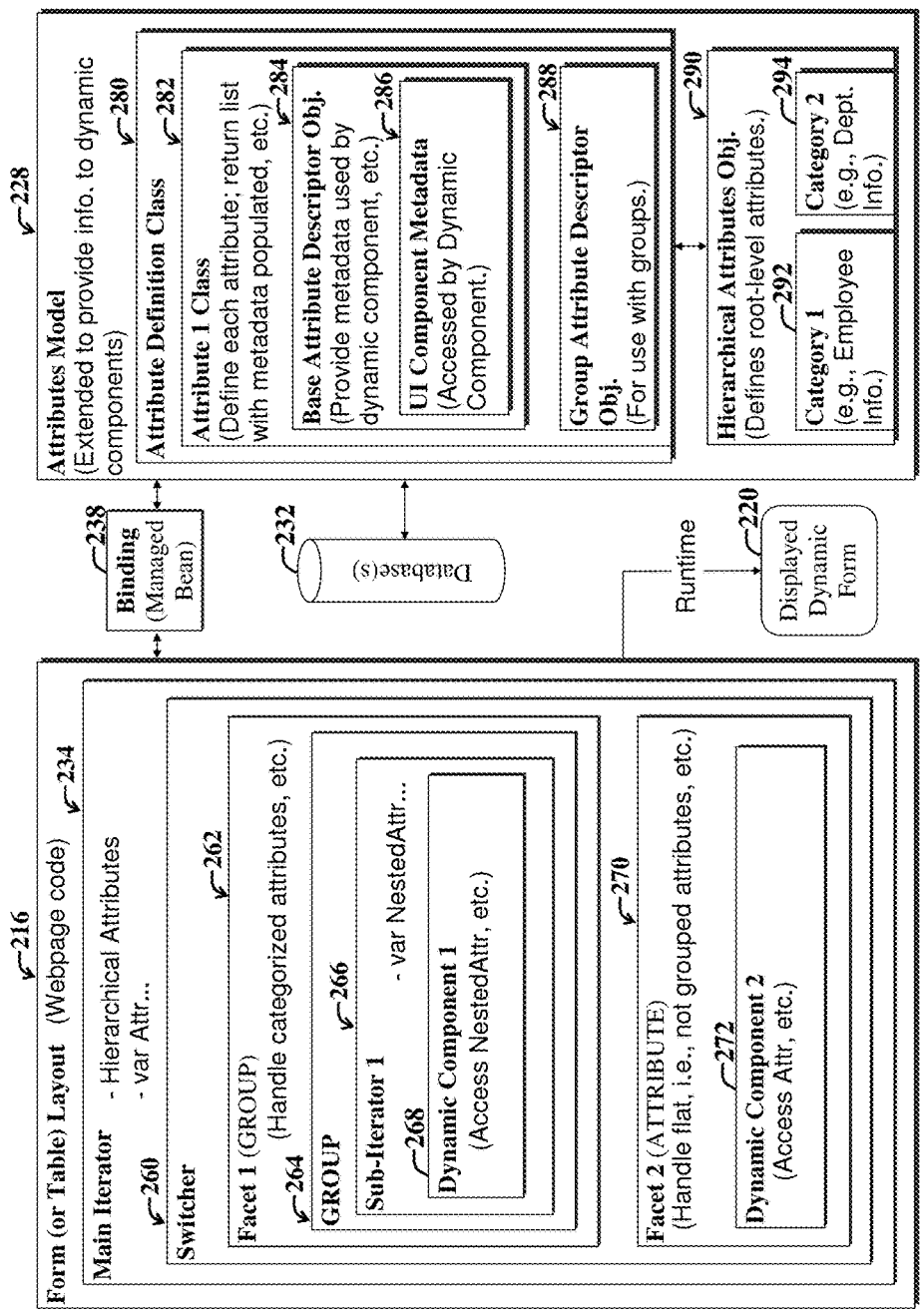
FIG. 6 is a more detailed diagram illustrating an example organization of computing objects that may characterize the attributes model and webpage code of the system of FIG. 5.

FIG. 6 is a more detailed diagram illustrating an example organization of computing objects, e.g., software components, which may characterize the attributes model 228 and webpage code 216 of the system 210 of FIG. 5. The example webpage code 216 communicates with the attributes model 228 via the binding 238. The attributes model 228 may communicate with the backend database 232, which may selectively provide data to computing objects or components 280-294 in the attributes model 228, e.g., in response to invocation of getter methods, etc.

For the purposes of the present discussion, an attributes model may be any data model characterized by a structure or arrangement of data, such as via one or more interrelated or intercommunicating data objects, wherein the data includes information, such as metadata (e.g., data characterizing an attribute), characterizing data and/or functionality to be displayed in a UI display screen.

Note that for the purposes of the present discussion, the terms "software component" and "computing object" may be employed interchangeably herein to refer to a collection of data and/or functionality. However, in general, a software component will include a set of functions and/or data that are semantically related to facilitate software re-use. Furthermore, in the present example embodiment, the computing objects or software components behave in accordance with inheritance or scoping rules, such that, for example, variables and associated data and software functions (e.g., methods) set forth via statements in a parent component may be accessed by a child component included within the parent component.

In the present example embodiment, the webpage code 216 and associated attributes model 228 have been configured to support nesting or grouping of attributes and associated UI components of a form 220 in a UI display screen. However, the example arrangement of objects shown in the webpage code 216 and attributes model 228 may also support generation of a dynamic table (or other UI feature) with nested attributes and associated UI components (e.g., a table with columns that have sub-columns), without departing from the scope of the present teachings.

The example webpage code 216 is shown as a form layout object or component 216, which includes a child main iterator component 234. Note that, in practice, the form layout object 216 may be included within another document object or component (not shown), as needed to meet the demands of a given implementation.

For the purposes of the present discussion, a form layout object may be any computing object or software component adapted to contain information describing how a form is to be displayed in a UI display screen, or otherwise providing data and/or functionality for facilitating form construction. Similarly, a table layout object may be any computing object adapted to contain information describing how a table is to be displayed in a UI display screen, or otherwise providing data and/or functionality for facilitating form construction.

The main iterator object 234 includes a specification of hierarchical attributes and variables that may be used by sub-components, also called child components 260-270. A switcher component 260 (also simply called a switcher) is a child component of the main iterator component 234 and includes a first facet 262, called the GROUP facet, and a second facet 270, called the ATTRIBUTE facet.

The GROUP facet 262 includes a group component 264, which includes a first sub-iterator component 266 (also simply called the first sub-iterator), which includes a first dynamic component 268. The first sub-iterator 266 is adapted to collect and hold nested attribute information derived from the attributes model 228, as discussed more fully below. The first dynamic component 268 is adapted to access information provided in a nested attribute variable of the first sub-iterator 266. For the purposes of the present discussion, a sub-iterator may be any iterator that is defined, specified, or called within another iterator component or object.

A second dynamic component 272 of the second facet is adapted to access attributes, which are flat, i.e., not hierarchical, which have been retrieved (from the attributes model 228) and stored in the main iterator 234 and/or second facet 270.

The switcher 260 is adapted to dynamically determine which facet component 262, 270 to activate or render at a given time. In some implementations, the switcher 260 may further facilitate selectively passing data from the main iterator 234 to the group facet 262 and the attribute facet 270. Note that the group facet 262 handles generation of grouped or nested UI components, also called hierarchically organized components. A switcher object may be any component adapted to dynamically determine which facet component to render.

For the purposes of the present discussion, a hierarchy may be any ordering of or arrangement of data and/or functionality, where different data and/or functionality in the arrangement may exhibit superior or subordinate relationships with other data and/or functionality. Furthermore, a hierarchy may refer to a displayed representation of objects or may refer to data and accompanying relationships existing irrespective of the representation. Similarly, a nested hierarchy of data, also simply called a data hierarchy, may be any data structure and accompanying data that is organized hierarchically. Similarly, a hierarchical object may be any object used to encapsulate data and/or functionality in a hierarchy.

Various hierarchical relationships of objects 234-272 in the webpage code 216 and objects 280-294 in the attributes model 228 may be specified via use of programming language tags or other programming language syntactical constructs, as discussed more fully below.

The attribute facet 270 is adapted to handle flat, i.e., attributes that are not grouped. Accordingly, the second dynamic component 272, which is a child of the attribute facet 270, is adapted to facilitate dynamic generation of UI features, i.e., UI components (e.g., form fields), that are not specifically grouped hierarchically.

In operation, the sub-iterator 266 of the group facet 262 is adapted to generate sub-UI components of a group of UI components defined by the main iterator 234. When data for a UI component (e.g., form field or table column) is fed to or accessed by the first dynamic component 268 of the sub-iterator 266, the UI component to be dynamically generated is said to be stamped by the iterator for generation by the associated dynamic component 268. Similarly, the second dynamic component 272 accesses attributes stamped from the main iterator 234 for generation of non-grouped UI components.

When the main iterator 234 collects attributes for generation of UI components, the main iterator 234 is said to iterate over an attributes collection maintained by the data model 228. However, as suggested above, the term "to iterate," as used herein, does not necessarily imply that any type of mathematical recursion or iteration is occurring.

The sub-iterator 266, which collects nested attributes, is said to be bound to the attributes collected by the main iterator 234. The first child dynamic component 268 is adapted to access the nested attributes maintained by the first sub-iterator to determine UI component type and value to display for each attribute record.

The example attributes model 228 represents an extended attributes model, which has been extended to accommodate dynamic components 268, 272 maintained in the webpage code 216. Those skilled in the art with access to the present teachings may readily extend or otherwise develop attributes models suitable for use with dynamic components to meet the needs of a given implementation, without undue experimentation.

The example attributes model 228 includes an attributes definition class 280, which may include definitions of various attributes, e.g., as maintained via one or more child attribute classes 282. Although only one child attribute class 282 is shown as a child of the attribute definition class 280, in practice, attribute classes for various types of attributes may be included in the definition class 280.

The example attribute class 282 is adapted to define a particular attribute and to return a list of attribute objects with associated metadata characterizing the attribute objects populated. Such data may be accessible to the iterators 234, 266 and associated dynamic components 268, 272 of the webpage code 216, e.g., via use of one or more MBeans 238.

The example attribute class 282 includes a base attribute descriptor object 284, which is adapted to provide (e.g., from the database 232) or maintain metadata 286 used by dynamic components. The dynamic component metadata 286 is selectively accessible to the second dynamic component 272, via the associated parent iterator 234.

The attribute class 282 further includes a group attribute descriptor object 288, which is particularly adapted for use with the main iterator 234, child group facet 262, and associated child sub-iterator 266 and dynamic component 268. The group attribute descriptor object 288 may represent an extended version of the base attribute descriptor object 284, whereby the extension supports group use.

In the present example embodiment, a hierarchical attributes object 290 is employed to support nesting or grouping of UI components. The hierarchical attributes object 290 may represent an extended version of the base attribute descriptor object 284, whereby if an attribute in the base attribute descriptor object 284 is characterized by a group name, then the associated attribute is added to the hierarchical attributes object 290.

The hierarchical attributes object 290 includes root-level attributes and attributes arranged according to category, i.e., group name. For example, the hierarchical attributes object 290 is shown including a first category 292 for maintaining employee information, and a second category for maintaining department information 294 pertaining to an employee.

Note that the software components and associated arrangements shown in FIG. 6 are merely illustrative and will vary depending upon the needs of a given implementation. For example, complex forms or tables with multiple different groupings and sub-groupings may include more facets and group objects than those shown.

Those skilled in the art will appreciate that various types of software and networking technologies may be employed to implement embodiments discussed herein. For example, Application Development Framework (ADF) Faces may be employed to implement dynamic components, e.g., via use of an <af:dynamicComponent> tag or element, which can be implemented to determine what components to display and their associated values, at runtime for a given implementation. Note that ADF Faces is a reusable collection (maintained via a programming language library) of Java Server Faces (JSF) components.

In the present example embodiment, such a dynamic component will only display the attributes needed for each rendered instance of UI display screen feature. Additionally, when any changes are made to an associated web service (e.g., business service), then the changes will be reflected by the dynamic component, without any change needed to the UI code, e.g., webpage code.

In general, dynamic components discussed herein are adapted to facilitate rendering a form or table, but embodiments are not limited thereto. At software runtime, needed components will be rendered within the form or table in place of one or more dynamic components used to define the form or table or portion(s) thereof. The rendered component will be based on the associated attribute and data type of the attribute characterizing the component to be displayed. For example, if the attribute is of data type "String," then an "inputText" component may be used. Similarly, if the attribute data type is "Date," then an "inputDate" component may be used. Various types of components, e.g., "inputText," "inputDate," and so on may be predefined via ADF Faces as types of dynamic components.

As shown in FIG. 6, for a form, the dynamic components 268, 272 are wrapped in iterator components 266, 234. The iterators 266, 234 are bound to the complete data collection, in this case, a collection of attributes in the attributes model 228. In general, an iterator stamps through each instance of an attribute on the attributes model 228, copying the data for the current instance into an attribute variable (also called a var attribute) of the iterator. The associated child dynamic component then accesses that "var" value for each instance of an attribute and accompanying UI component using the attribute model attribute maintained via the var variable of the parent iterator. The dynamic component then uses that information to determine the type of component to use, how to configure it, and its value.

The following example pseudo code illustrates example code constructs for implementing a dynamic form without grouping, and includes various tags associated with corresponding programming language elements. The tags demarcate computing objects. For an example, an iterator computing object may be specified via an opening tag (e.g., <af:iterator>) and a closing tag (e.g., </af:iterator>). The iterator element corresponding to the iterator tag may handle all attributes configured to be included in a dynamic form. For each attribute of a data model to be rendered via a dynamic component (e.g., as identified by an opening tag <af:dynamicComponent> and a closing tag </af:dynamicComponent>), the dynamic component loads, at runtime of the webpage computer code 216, information pertaining to the associated UI component to be constructed based on the associated data attribute type. Example pseudo code that may be included in webpage code for facilitating implementing a dynamic form without grouping is as follows:

```
<af:panelFormLayout id="pfl1">
  <af:iterator
    id="i1" value="2{bindings.EmpVO1.attributesModel.attributes}"
      var="attr">
        <af:dynamicComponent id="it1" attributeModel="2{attr}">
  </af:iterator>
</af:panelFormLayout>
```

Accordingly, as indicated via the tags in the above pseudo code, the panel form layout object (e.g., as identified via the <af:panelFormLayout id="pfl1"> tag) includes an iterator component (e.g., as identified via the </af:iterator> tag), which contains a dynamic component specification (e.g., as identified via the <af:dynamicComponent> tag). Hence, the above pseudo code specifies that the dynamic component (and associated attributes) is defined by a particular iterator within which the dynamic component is defined, which is in turn included in a panel for layout object. Note that the dynamic component references the "attr" variable of the parent iterator to facilitate construction of an associated UI component.

Similarly, for a dynamic table, the accompanying iterator component handles collection of data for all attributes configured to be included in a dynamic form. For each data attribute and associated data collected by the iterator, the dynamic component loads the default UI component information at runtime based on the data attribute type. Example pseudo code for a dynamic table without attribute nesting is as follows:

```
<af:table value="2{bindings.EmpVO1.collectionModel}"
    var="row" id="t1" ...>
  <af:iterator
    value="2{bindings.EmpVO1.attributesModel.attributes}"
      id="itr1" var="column">
        <af:column headerText="2{column.label}" id="dcc1">
          <af:dynamicComponent attributeModel="2{column}"
            id="dc1"/>
        </af:column>
  </af:iterator>
</af:table>
```

Accordingly, the pseudo code above illustrates specification of a table object that includes an iterator, which includes a column object, which includes a dynamic component for facilitating generating rendering instructions for each column accessible to the dynamic component via a variable of the parent iterator.

To implement attribute grouping in a form, a switcher component and group component may be specified, for example, as follows:

```
<af:panelFormLayout id="pfl1">
  <af:iterator id="i1"
      value="2{bindings.EmpVO1.attributesModel.hierarchicalAttributes}" var="attr">
    <af:switcher id="sw" facetName="2{attr.descriptorType}"
          defaultFacet="ATTRIBUTE">
      <f:facet name="GROUP">
        <af:group title="2{attr.label}">
          <af:outputText value="2{attr.name}" id="ot2"/>
          <af:iterator id="i2" value="2{attr.descriptors}" var="nestedAttr">
            <af:dynamicComponent attributeModel="2{nestedAttr}" id="dc1"/>
          </af:iterator>
        </af:group>
      </f:facet>
      <f:facet name="ATTRIBUTE">
        <af:dynamicComponent attributeModel="2{attr}" id="dc2"/>
      </f:facet>
    </af:switcher>
```

```
    </af:iterator>
</af:panelFormLayout>
```

Note that the structure of the pseudo code above parallels the example arrangement of software components shown in FIG. 6, to the extent that the pseudo code illustrates a switcher component (e.g., as specified via the <af:switcher> tag) nested within a main iterator, which is nested within a panel form layout object. Furthermore, a group facet (e.g., as identified via the <f:facet> tag) includes a group object (<af:group>), which includes a sub-iterator and sub-dynamic component. Similarly, an attribute facet (<f:facet name="ATTRIBUTE">) includes a dynamic component for implementing flat UI components, i.e., UI components that are not particularly grouped.

Note that attributes of a given form, table, or other data visualization may be readily customized using various embodiments discussed herein. Various levels of customization may be employed. For example, one level of customization may be performed at model layer, where the customization is facilitated via UI hints, i.e., context information. Customization can also be achieved at UI webpage level, or through tag attributes. Furthermore, a hybrid customization involving UI hints and editing of tag attributes may be employed. For hybrid customization, certain UI hints may be overridden. Such overriding of UI hints may be implemented via an extended base attribute descriptor object that binds the attributes model of a dynamic component to an extended and customized attributes model.

Figure 7:
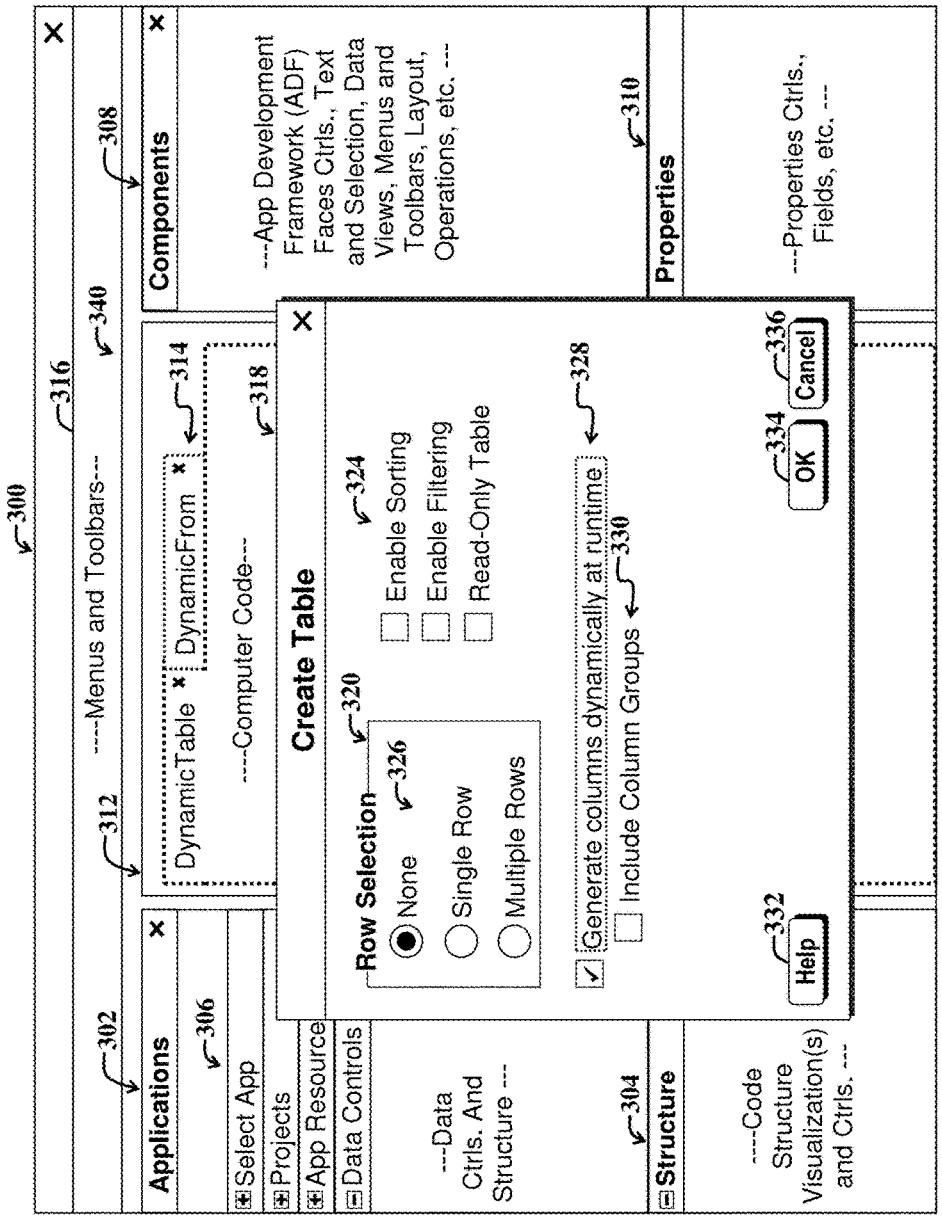
FIG. 7 shows a first example developer user interface display screen usable to construct and/or modify computing objects and relationships of the webpage code and attributes model of FIG. 6 for dynamic rendering of a table in a webpage user interface display screen.

FIG. 7 shows a first example developer UI display screen 300 usable to construct and/or modify computing objects and relationships of the webpage code 216 and attributes model 228 of FIG. 6 for dynamic rendering of a table in a webpage UI display screen. The example developer user UI display screen 300 may be presented via the display 246 of the developer system 240 of FIG. 5.

The example developer UI screen 300 may include various menus and toolbars 316 for accessing functionality and manipulating various panels and windows 302-314 of an authoring section 340; for activating a create-table dialog box 318, and so on. The example create-table dialog box 318 includes a row-selection section 320 with various user options 326 (implemented via radio buttons) for enabling user (i.e., developer) selection or one or more rows in a table to be created and applying various other user options 324, 328, 330 to selected rows.

For example, no rows in a subsequently selected table will be selected for applying sorting, filtering, and so on, as indicated via a first set of check boxes 324. The first set of check boxes 324 may result in automatic generation of computer code for (for a table to be created) for enabling sorting, filtering, and/or read-only functionality.

The create-table dialog box 318 further includes a checkbox user option 328 for facilitating creating a table wherein one or more columns are to be dynamically generated at runtime. Another check-box user option 330 enables a developer to specify whether column grouping is to be employed, i.e., whether computer code and associated software components should be automatically generated for supporting nesting of attributes.

Note that in the present example embodiment, the dynamic-column check box 328 is enabled. Note that when the dynamic-column check box 328 is disabled, additional or different user options and/or information may appear in the create-table dialog box 318. The example dialog box further includes a help button 332 for enabling developer access to help content; a cancel button 336 for canceling table creation, and an Ok button 334 for accepting selections made via the create-table dialog box 318 and for initiation of code generation.

The underlying code generator (e.g., the code generator 248 of FIG. 5) may generate so-called overhead code, which may be displayed in a code section 314 of the developer UI display screen 300. Generated computer code in the code section 314 may be modified manually by a user, such as a developer, by typing in the code section 314; by dragging and dropping various components 308 into the code section 314; and by manipulating other features of various panels 302-310 of the authoring section 340.

The example authoring section 340 includes an applications panel 302 with various sub-panels 306. The sub-panels may include various UI controls for selecting applications, software projects, application resources, data controls, and so on, for facilitating developing or modifying webpage code and/or an attributes model.

A structure panel 304 may provide a graphical depiction of the hierarchical structure of computing objects included in the computer code of the code section 314. The hierarchical structure may correspond, for example, to the component relationships shown in the webpage computer code of FIG. 6.

In certain implementations, the structure 304 may be modified, e.g., via dragging and moving representations of components within the structure section 304, resulting in automatic adjustment of computer code of the code section 314. The structure window 304 may provide one or more user options to, for example, to replace a column object and/or its contents with another object and/or contents.

The authoring section 340 further includes a components panel 308, which may include various Application Development Framework (ADF) Faces controls, text input and selection controls, data views controls, menus and toolbars controls, layout operations, and so on. Accordingly, the components menu 308 may facilitate adding software components and associated data and functionality to webpage code or an attributes model. The components panel 308 may be adapted to enable a developer to drag and drop certain components into the code section 314 to trigger automatic generation of computer code needed to support the added component. The generated code can then be further edited by a developer as needed to meet the needs of a given implementation.

Accordingly, the components panel 308 may provide user options to position an iterator object as a child object of the layout object; to position a dynamic component object as a child object of the iterator object; and to drag and drop objects, such as a table object or form object, to facilitate binding it to data to be used to populate information to display via the form or table.

Similarly, the properties panel 310 may include various UI controls, such as properties controls, controls for adding fields to a table or form, and so on. In certain implementations, certain properties may be selected or entered into the properties panel 310, and/or representations of the properties can be dragged and dropped into the computer code section 314 to facilitate automatic code generation.

The properties panel 310 may provide user options to specify one or more attributes to be used by a dynamic component, including values (e.g., as specified via an expression language expression that resolves attributes property on the attributes model object) and variables (e.g., as specified via a string that can be used to access attributes of the attributes model). The properties panel 310 may include additional user options, e.g., as implemented via drag-and-drop functionality) to position a switcher object as a child object of the iterator object; to identify or specify a facet via expression language, wherein the facet resolves to a property characterizing an iterator containing the switcher object, and so on.

Note that software for implementing automatic code generation is known in the art. Accordingly, those skilled in the art with access to the present teachings may readily develop a suitable code generator capable of generating code for use with dynamic components, without undue experimentation.

FIG. 8 shows an example of a dynamic table 350 exhibiting attribute grouping, which may be developed via the developer system 240 of FIG. 5 and associated developer UI display screen 300 of FIG. 7, and which may be rendered as part of a webpage UI display screen (e.g., 222 of FIG. 5).

The example table 350 includes various columns 352-358 corresponding to various data attributes characterizing employee data. The columns 352-358 include a manager a manager column 352, a hire date column 354, an employee personal column, and a department information column 358.

Note that the employee personal column 356 and the department information column 358 represent nested attributes. The personal column 356 and department information column 358 are called grouped columns, since they correspond to group categories. For example, the employee personal column 356 further includes sub-columns, including an employee number column, an employee name column, and an employee salary column, each of which represent sub-attributes of the employee personal column 356. Similarly, the department information column 358 includes a department number sub-column and a department name sub-column.

The various sub-columns of the employee personal column 356 and the department information column 358 may be dynamically implemented via one or more sub-iterators, e.g., the iterator 266 and associated dynamic component 268 of FIG. 6. Similarly, the non-grouped columns 352, 354 (i.e., non-nested columns) represent flat columns that may be implemented via an iterator and flat dynamic component, such as the main iterator 234 and dynamic component 272, respectively, of FIG. 6.

Figure 9:
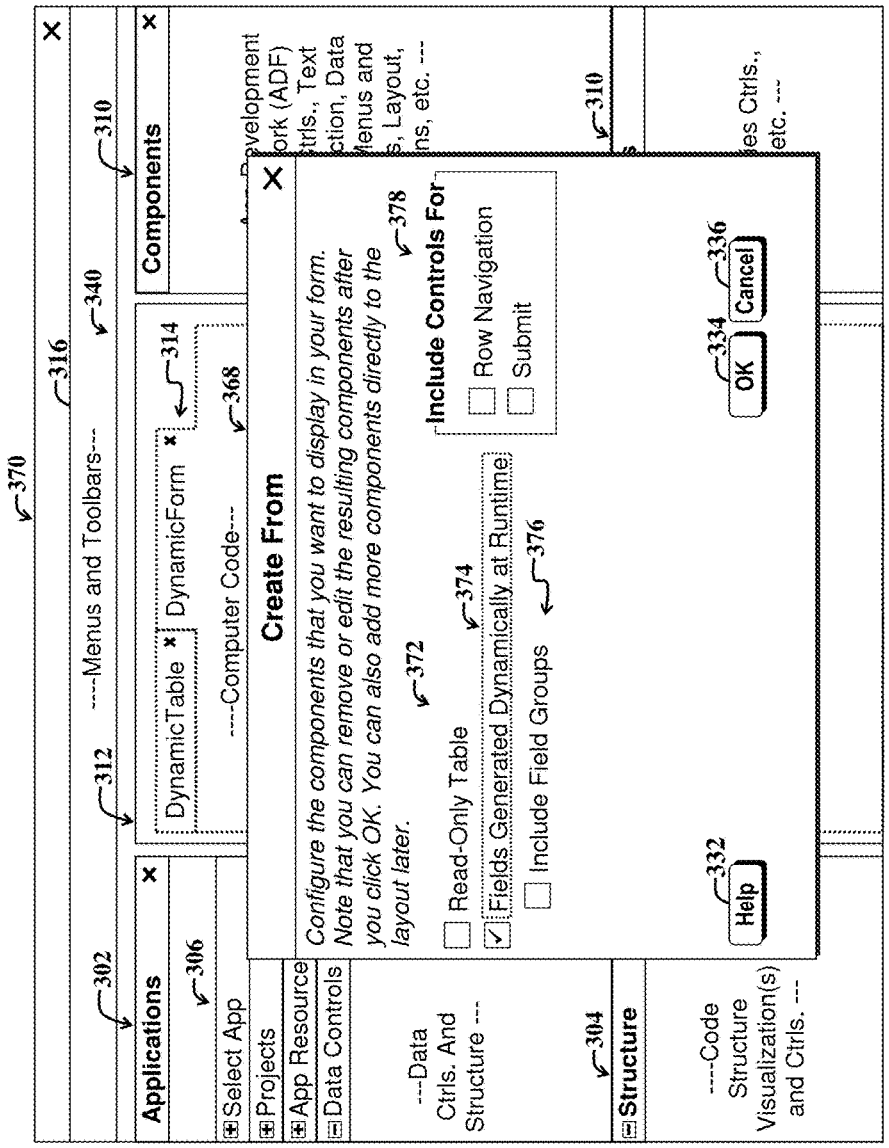
FIG. 9 shows a second example developer user interface display screen and accompanying dialog box for facilitating authoring computer code for dynamic rendering of a form in a webpage user interface display screen.

FIG. 9 shows a second example developer UI display screen 370 and accompanying dialog box 368 for facilitating authoring computer code for dynamic rendering of a form (such as the dynamic form 220 of FIG. 5) in a webpage UI display screen. The second example developer UI screen 370 is similar to the first example developer UI screen of FIG. 7 with the exception of the displayed create-form dialog box 368, and selection of a dynamic form tab in the code section 314.

The example create-form dialog box 368 includes various checkboxes 372-378, including check boxes 378 for selecting table functionality, e.g., row navigation and/or form-submit functionality, to be employed in a form to be created. The checkboxes 372-378 further include a read-only table user option 372, a check box 374 for enabling dynamic field generation at runtime, and a check box 376 for including field groups in a form to be created.

In the present example embodiment, a user, e.g., a developer, has selected the fields-generated-dynamically-at-runtime user option 374. Accordingly, subsequently generated code for a table will include one or more dynamic components adapted to access collected attribute data from an iterator to dynamically stamp columns in a table in accordance with the associated attribute model structure and contents.

If the developer had also selected the include-field-groups user option 376, the resulting generated code would include components for enabling handling of nested attributes and associated dynamic generation of UI components for the nested, i.e., hierarchical or grouped attributes. For example, in this case, a switcher component, facets, sub-iterators, and one or more dynamic components included in the sub-iterators would be employed, and corresponding code to support such structures would be generated and displayed in the code section 314.

Figure 10:
FIG. 10 shows an example dynamic form exhibiting attribute grouping, which may be developed via the developer system of FIG. 5 and associated developer user interface display screen of FIG. 9, and which may be rendered as part of a webpage user interface display screen.

FIG. 10 shows an example dynamic form 420 exhibiting attribute grouping, which may be developed via the developer system of FIG. 5 and associated developer UI display screen 370 of FIG. 9, and which may be rendered as part of a webpage UI display screen (e.g., corresponding to the dynamic form 420 of FIG. 5).

The dynamic form 420 includes a flat section 396, which includes UI components that are not part of a particular category or group, and further includes a personal information section 392 and a department information section 394. Various UI components 398 included in the personal information section represent UI components and associated attributes (e.g., employee number, name, and salary) that are part of, i.e., nested within, a personal information group corresponding to the personal information section 392.

Similarly, various UI components 400 included within the department information section 394 may be implemented by dynamic components belonging to one or more sub-iterator components of a group object within a facet that is within a switcher that is a child component or object of a main iterator (e.g., as shown in FIG. 6 with reference to the sub-iterator 266, group 264, facet 262, switcher 260, and main iterator 234).

For illustrative purposes, additional UI controls 402, e.g., for navigating data shown in a form, such as by displaying information pertaining to a previous or subsequent employee record are shown, in addition to a submit button for submitting form information. Accordingly, dynamic tables and forms, as discussed herein may be made fully functional, yet may dynamically adapt to changes in an underlying data model.

FIG. 11 shows an example developer UI display screen 410 for facilitating configuring UI hints 414, i.e., contextual information, usable by webpage computer code to facilitate dynamic rendering of UI components. Developer changes to the UI hints 414 represent model layer configuration changes. By way of example, a label for an attribute associated with UI control to be dynamically rendered has been set to "Jing test."

In the present example embodiment, the hints UI display screen 410 is implemented as a tab 412 with various editable fields and drop-down menus pertaining to different types of UI hints, such as UI component label, tool top, formatting, width, height, form type, category, automatic data submission, and so on. Additional user options 416 adjacent to the fields and drop-down menus 414 enable further editing, such as by searching for labels, adding items to a drop-down menu, and so on.

Note that the various developer-configurable UI hints 414 may be encoded in computing objects, i.e., software components or classes of a data model, e.g., the attributes model 228 of FIG. 6, which may be read, processed via dynamic components (and associated iterators), e.g., the dynamic components 268, 272 of the webpage code 26 of FIG. 6, to facilitate dynamic or automatic rendering of UI display screen features (i.e., automatic generation of rendering instructions for rendering of UI display screen features). In such instances, changes to the UI hints 414 appear in the data model and then automatically propagate the associated webpage code. Accordingly, such modifications are said to be data-model driven.

Figure 12:
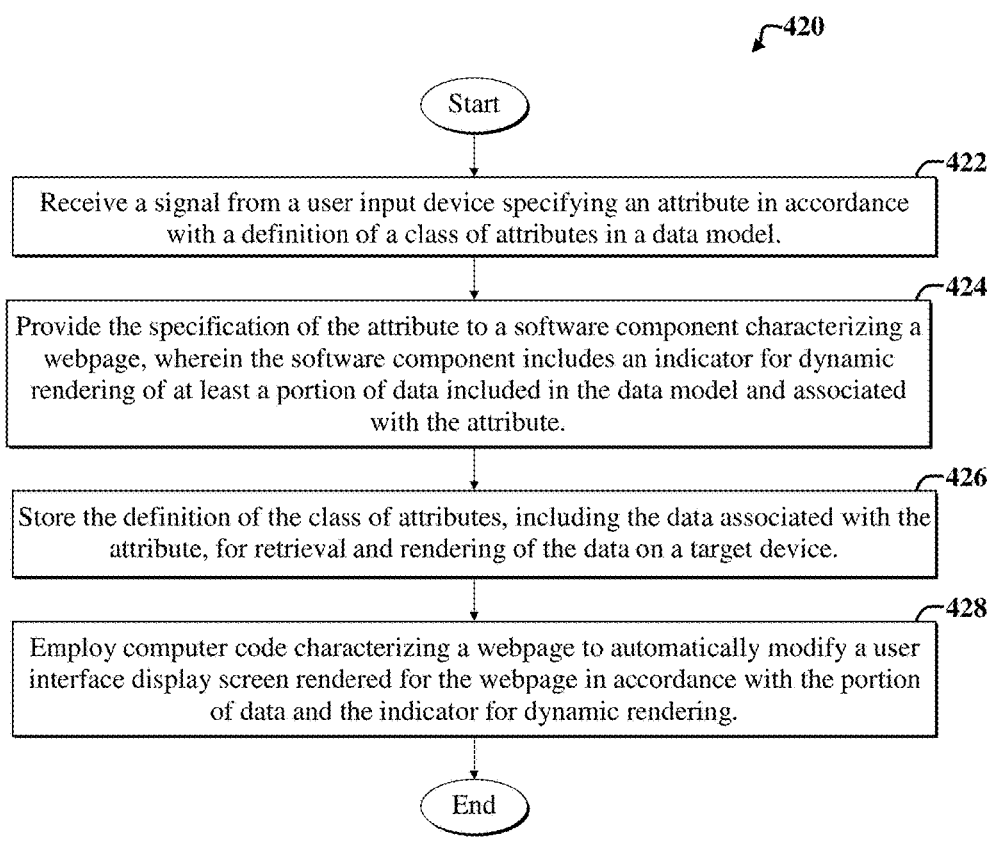
FIG. 12 is a flow diagram of a first example method for facilitating authoring computer code for facilitating dynamic rendering a portion of a user interface display screen via the system of FIG. 5.

FIG. 12 is a flow diagram of a first example method 420 for facilitating authoring computer code for facilitating dynamic rendering a portion of a UI display screen via the system 20 of FIG. 5. The example method 420 includes a first step 422, which includes accepting a signal from a user input device (e.g., as may be represented by the developer system 240 of FIG. 5) to specify an attribute in accordance with a definition of a class of attributes, e.g., corresponding to a computing object or software component, in a data model.

A second step 424 includes providing the specification of the attribute to a software component characterizing a webpage, wherein the software component includes an indicator for dynamic rendering of at least a portion of data included in the data model and associated with the attribute.

A third step 426 includes storing the definition of the class of attributes, including the data associated with the attribute, for retrieval and rendering of the data on one or more target devices, such as the client systems 22 of FIG. 5.

A fourth step 428 includes employing the computer code characterizing the webpage to automatically modify a UI display screen in accordance with the portion of data associated with the attribute and in accordance with the indicator for dynamic rendering (e.g., corresponding to a dynamic component).

Note that the method 420 may be modified, such as by adjusting one or more of the steps 422-428, adding additional steps, removing steps, re-ordering steps, and so on. For example, an example modified method may include: facilitating setting an attribute of a UI feature by providing a first mechanism for facilitating modification of one or more attributes of the data model; propagating one or more modifications to the data model to computer code characterizing a webpage; and employing the computer code characterizing the webpage to automatically modify a UI display screen rendered for the webpage in accordance with the one or more modifications to the data model.

Additional steps may include, for example, implementing the step of employing at runtime of the computer code characterizing the webpage, wherein computer code characterizing the webpage includes a portion of computer code that is adapted to communicate with a data model and to then generate a UI feature based on the data model. The portion of computer code may include a dynamic component, and the corresponding UI feature may include a form or table, wherein an attribute of the one or more attributes is associated with a form field or a table column.

Additional steps may include providing one or more user options to customize a feature of a UI display screen to be presented via a webpage by modifying a portion of a data model used by the dynamic component. Additional user options may enable employing a dynamic component to reference the data model and to generate a UI feature that includes plural components.

An iterator computing object may be employed to collect data and to provide the data to the dynamic component to facilitate rendering a UI feature in place of the dynamic component at runtime of the dynamic component. Another user option may facilitate triggering creation of a layout object, such as a form layout or table layout object, to characterize a portion of a UI display screen.

Drag-and-drop functionality may facilitate enabling a user to position an iterator object, e.g., by dragging and dropping a representation of an iterator object, as a child object of the layout object. Another user option, such as provided by a properties panel, may facilitate enabling a user to specify one or more attributes to be used by a dynamic component. Another user option, such as provided by a components panel, may facilitate enabling a user to position a dynamic component object as a child object of the iterator object, such as by dragging and dropping representations of dynamic components. Another user option may be provided to employ a dynamic component to reference the data model and to generate a user interface feature that includes plural components.

User options, e.g., as provided by one or more input fields or UI controls in a properties panel of a developer UI display screen, may facilitate enabling a user to specify a value representing an expression language expression that resolves to a hierarchical object in the attributes model. The hierarchical object may include information pertaining to different categories of data to be positioned in different sections of a UI display screen.

Figure 13:
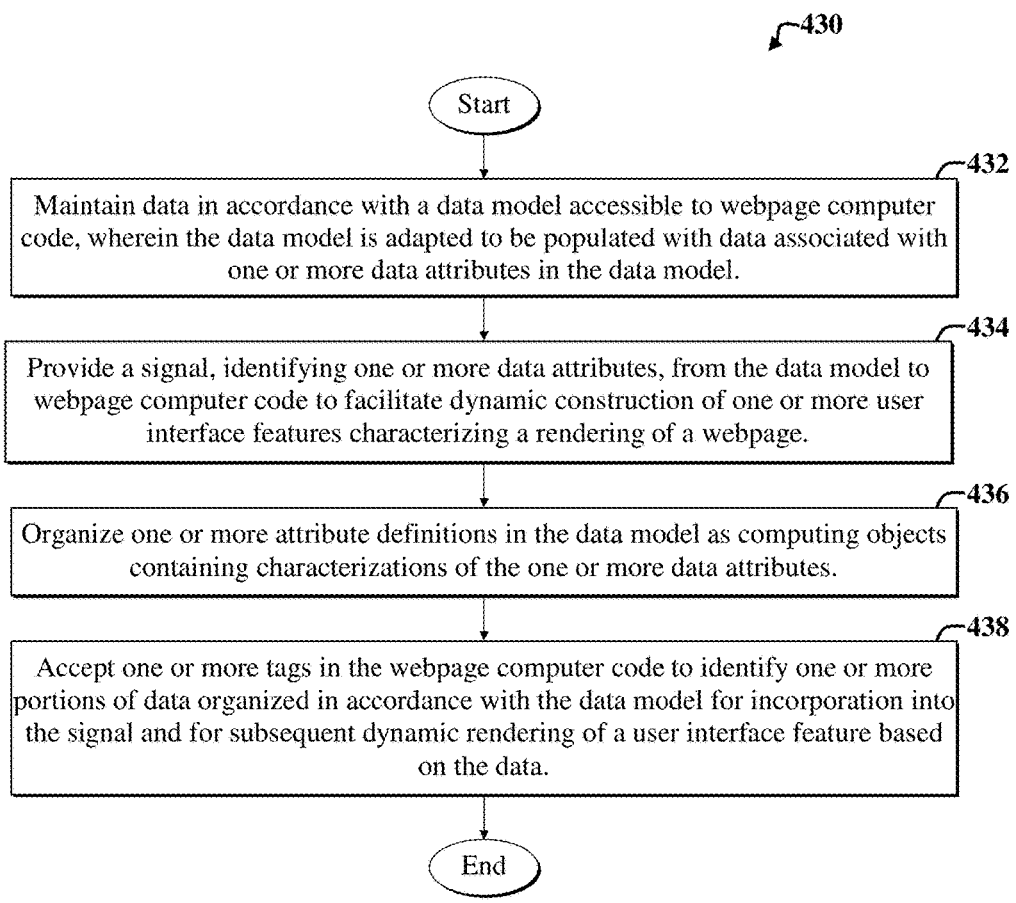
FIG. 13 is a flow diagram of a second example method for characterizing data to facilitate dynamic rendering a portion of a user interface display screen via the system of FIG. 5.

FIG. 13 is a flow diagram of a second example method 430 for characterizing data to facilitate dynamic rendering a portion of a UI display screen via the system 210 of FIG. 5. The second example method 430 includes an initial data-maintaining step 432, which involves maintaining data in accordance with a data model accessible to webpage computer code, wherein the data model is adapted to be populated with data associated with one or more data attributes in the data model.

A subsequent signal-providing step 434 includes providing a signal, identifying one or more data attributes, from the data model to webpage computer code to facilitate dynamic construction of one or more UI features characterizing a rendering of a webpage. The data attribute is associated with an attribute definition.

Next, an organizing step 436 includes organizing one or more attribute definitions in the data model as computing objects containing characterizations of the one or more data attributes. Organizing may include employing one or more tags in the webpage computer code to identify one or more portions of data organized in accordance with the data model for incorporation into the signal and for subsequent rendering of a UI feature based on the data. The one or more tags include an iterator tag corresponding to an iterator computing object that includes a dynamic component.

Although the description has been described with respect to particular embodiments thereof, these particular embodiments are merely illustrative, and not restrictive. For example, while certain embodiments discussed herein illustrate nesting of attributes and associated UI components in forms and tables, embodiments are not limited thereto. For example, other types of visualizations, such as charts, graphs, sunburst visualizations, and so on, may be adapted for dynamic rendering in accordance with embodiments discussed herein, without departing from the scope of the present teachings.

Furthermore, embodiments are not limited to implementations involving grouping or nesting of attributes used to construct UI display screen features. In addition, while two-level nesting is shown, attributes may be further nested and implemented via dynamic components, without departing from the scope of the present teachings.

In addition, while certain embodiments discussed herein illustrate dynamic construction of data tables in a user interface display screen based on an analysis of context information characterizing a data model, embodiments are not limited thereto. For example, other renderings of data and user interface display screen components, such as various types of visualizations and accompanying user interface controls may be rendered via embodiments discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating configuration of a user interface display screen, the method comprising:
   during runtime of a software application used to construct user interface display screens based on a data model:
      accessing the data model with a first shape characteristic specified at design time;
      automatically rendering a first user interface display screen based on the first shape characteristic;
      determining context information associated with data, wherein the data is maintained in accordance with the data model, and wherein the context information includes information specifying one or more attributes relating to the data model;
      generating a signal when the context information changes, wherein the changed context information provides second shape characteristic that was created during the runtime;
      employing the signal to automatically configure one or more characteristics of a user interface architecture, resulting in an adjusted user interface architecture that reflects the second shape characteristic; and
      automatically rendering a second user interface display screen based on the adjusted user interface architecture that reflects the second shape characteristic that was created during the runtime.

2. The method of claim 1, wherein the generating further includes analyzing the one or more attributes to determine a modification to be made to the user interface architecture, wherein the signal includes a specification of the modification to be made to the user interface architecture.

3. The method of claim 2, wherein the employing occurs at the runtime of the software application used to construct the second user interface display screen based on the adjusted user interface architecture, and further includes generating information for rendering the second user interface display screen in accordance with the adjusted user interface architecture.

4. The method of claim 3, wherein the generated information for rendering includes table width or height based on the second shape characteristic of the data model, wherein the second shape characteristic is included among the context information.

5. The method of claim 1, further including providing a user option to specify one or more portions of the context information.

6. The method of claim 1, further including employing the adjusted user interface architecture to render the second user interface display screen.

7. The method of claim 6, wherein the second user interface display screen includes data and software functionality that has been automatically adjusted in accordance with one or more adjustments made to the user interface architecture in the step of employing.

8. The method of claim 6, wherein the determining further includes deriving one or more portions of the context information from the user interface architecture, wherein the one or more portions of the context information include a description of one or more user interface features or characteristics of the second user interface display screen to be rendered.

9. The method of claim 8, wherein the one or more user interface features or characteristics include one or more user interface validators.

10. The method of claim 1, further including employing the user interface architecture and user interface framework software encoding the user interface architecture to enable field-level stamping.

11. The method of claim 10, further including automatically determining one or more characteristics of a table to be displayed in the second user interface display screen in accordance with the user interface architecture at the runtime of the software application employing the method.

12. The method of claim 11, wherein the one or more characteristics include table width or height, and further including employing the context information to automatically characterize and render one or more form fields in a user interface display screen.

13. The method of claim 1, wherein the context information further includes context information associated with a user.

14. The method of claim 13, wherein the context information associated with a user includes information specifying one or more user privileges.

15. The method of claim 1, wherein employing further includes adjusting a binding between the data model and the user interface architecture based on the context information.

16. The method of claim 1, wherein the context information includes information indicating a characteristic of a first a grouping of displayed data.

17. The method of claim 16, wherein the first grouping of displayed data is within a second grouping of displayed data, and wherein context information further includes information indicating a characteristic of the second grouping of displayed data.

18. An apparatus comprising:
a digital processor coupled to a display and to a processor-readable storage device, wherein the processor-readable storage device includes one or more instructions executable by the digital processor to perform operations comprising:
during runtime of a software application used to construct user interface display screens based on a data model:
accessing the data model with a first shape characteristic specified at design time;
automatically rendering a first user interface display screen based on the first shape characteristic;
determining context information associated with data, wherein the data is maintained in accordance with the data model, and wherein the context information includes information specifying one or more attributes relating to the data model;
generating a signal when the context information changes, wherein the changed context information provides second shape characteristic that was created during the runtime;
employing the signal to automatically configure one or more characteristics of a user interface architecture, resulting in an adjusted user interface architecture that reflects the second shape characteristic; and
automatically rendering a second user interface display screen based on the adjusted user interface architecture that reflects the second shape characteristic that was created during the runtime.

19. A processor-readable storage device including instructions executable by a digital processor, the processor-readable storage device including one or more instructions for:
during runtime of a software application used to construct user interface display screens based on a data model:
accessing the data model with a first shape characteristic specified at design time;
automatically rendering a first user interface display screen based on the first shape characteristic;
determining context information associated with data, wherein the data is maintained in accordance with the data model, and wherein the context information includes information specifying one or more attributes relating to the data model;
generating a signal when the context information changes, wherein the changed context information provides second shape characteristic that was created during the runtime;
employing the signal to automatically configure one or more characteristics of a user interface architecture, resulting in an adjusted user interface architecture that reflects the second shape characteristic; and
automatically rendering a second user interface display screen based on the adjusted user interface architecture that reflects the second shape characteristic that was created during the runtime.

* * * * *

UNITED STATES PATENT AND TRADEMARK OFFICE
CERTIFICATE OF CORRECTION

PATENT NO. : 9,996,322 B2
APPLICATION NO. : 14/137917
DATED : June 12, 2018
INVENTOR(S) : Sullivan et al.

Page 1 of 1

It is certified that error appears in the above-identified patent and that said Letters Patent is hereby corrected as shown below:

In the Drawings

Drawing sheet 7 of 13, in FIG. 7, under Reference Numeral 314, Line 1, delete "DynamicFrom" and insert -- DynamicForm --, therefor.

In the Specification

Column 4, Line 22, delete "may be may be" and insert -- may be --, therefor.

Column 25, Line 10, delete "e.g.," and insert -- (e.g., --, therefor.

Column 25, Line 11, delete "functionality)" and insert -- functionality,) --, therefor.

Signed and Sealed this
Twenty-second Day of January, 2019

Andrei Iancu
*Director of the United States Patent and Trademark Office*